United States Patent
Maetaki

(10) Patent No.: US 9,703,112 B2
(45) Date of Patent: Jul. 11, 2017

(54) ZOOM LENS AND IMAGE-PICKUP APPARATUS

(71) Applicant: CANON KABUSHIKI KAISHA, Tokyo (JP)

(72) Inventor: Satoshi Maetaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/048,618

(22) Filed: Oct. 8, 2013

(65) Prior Publication Data

US 2014/0098253 A1    Apr. 10, 2014

(30) Foreign Application Priority Data

Oct. 10, 2012    (JP) ................. 2012-225027

(51) Int. Cl.
| | |
|---|---|
| *G02B 27/64* | (2006.01) |
| *G02B 15/14* | (2006.01) |
| *G02B 15/22* | (2006.01) |
| *G02B 15/177* | (2006.01) |

(52) U.S. Cl.
CPC ........... *G02B 27/646* (2013.01); *G02B 15/14* (2013.01); *G02B 15/177* (2013.01); *G02B 15/22* (2013.01)

(58) Field of Classification Search
CPC ........ G02B 15/00; G02B 15/14; G02B 15/15; G02B 27/64; G02B 27/646
USPC .................. 359/557, 676, 684, 686
See application file for complete search history.

(56) References Cited

U.S. PATENT DOCUMENTS

| | | | | |
|---|---|---|---|---|
| 5,751,496 | A | * | 5/1998 | Hamano ............... 359/677 |
| 5,774,267 | A | * | 6/1998 | Kodama ........... G02B 27/646 |
| | | | | 359/557 |
| 6,650,475 | B1 | * | 11/2003 | Hamano ............... 359/557 |
| 7,382,550 | B2 | | 6/2008 | Nishimura |
| 8,189,074 | B2 | | 5/2012 | Miyazaki et al. |
| 2008/0198476 | A1 | * | 8/2008 | Kimura ............ G02B 15/161 |
| | | | | 359/687 |
| 2010/0165480 | A1 | * | 7/2010 | Yamaguchi ....... G02B 27/646 |
| | | | | 359/686 |
| 2010/0196003 | A1 | * | 8/2010 | Miyazaki et al. ......... 396/529 |

(Continued)

FOREIGN PATENT DOCUMENTS

| | | |
|---|---|---|
| JP | 2007-78834 A | 3/2007 |
| JP | 2007-156078 A | 6/2007 |

(Continued)

OTHER PUBLICATIONS

Office Action issued in corresponding Japanese Patent Application No. 2012-225027 on Aug. 23, 2016.

*Primary Examiner* — Thong Nguyen

(74) *Attorney, Agent, or Firm* — Carter, DeLuca, Farrell & Schmidt, LLP

(57) ABSTRACT

A zoom lens includes, in order from an object side to an image side, a first lens unit having a negative refractive power, a second lens unit having a positive refractive power, and a rear unit including a plurality of lens units. A distance between adjacent lens units changes during zooming. An aperture stop is arranged on an image side of the first lens unit. An image stabilizing unit Ls comprising at least part of the second lens unit moves in a direction perpendicular to an optical axis during blurring correction. The predetermined conditional expressions are satisfied.

11 Claims, 15 Drawing Sheets

(56) References Cited

U.S. PATENT DOCUMENTS

| | | | | |
|---|---|---|---|---|
| 2012/0176529 A1* | 7/2012 | Matsuo et al. | ................ | 348/345 |
| 2012/0229903 A1* | 9/2012 | Matsumura | .................. | 359/557 |
| 2013/0162884 A1* | 6/2013 | Tashiro et al. | ................ | 348/345 |
| 2014/0028891 A1* | 1/2014 | Otake et al. | .................. | 348/335 |

FOREIGN PATENT DOCUMENTS

| | | |
|---|---|---|
| JP | 2009-251112 A | 10/2009 |
| JP | 2014-048373 A | 3/2014 |
| WO | 2011001663 A1 | 1/2011 |

\* cited by examiner

ZOOM LENS AND IMAGE-PICKUP APPARATUS

BACKGROUND OF THE INVENTION

Field of the Invention

The present invention relates to a zoom lens and an image pickup apparatus suitable an image pickup optical system, for example, such as a digital camera, a video camera, a TV camera, a security camera, and a silver-halide film camera.

Description of the Related Art

A wide angle of view, a small size in an entire lens system and an image stabilizing mechanism are demanded for a zoom lens used for an image pickup apparatus. Especially, in the case of correcting an image blurring by moving an image stabilizing lens unit in a direction perpendicular to an optical axis direction, a small and light image stabilizing lens unit and a low variation in aberrations when correcting the image blurring are demanded so as to miniaturize a moving mechanism (an image stabilization mechanism) and save electric power thereof.

Therefore, it is important for a zoom lens having an image stabilizing mechanism to properly set configurations of an entire lens system and an image stabilizing lens unit. For example, it is important to properly set a refractive power of the image stabilizing lens unit and a distance between an aperture stop and the image stabilizing lens unit. If these configurations are not properly set, it is difficult to achieve a miniaturization in an entire system, a wide angle of view and a miniaturization of an image stabilizing mechanism and maintain a high optical performance during vibration control.

A negative-lead type zoom lens arranging a lens unit having a negative refractive power on the most object side is suitable for acquiring a zoom lens having a wide angle of view.

U.S. Pat. No. 7,382,550 discloses a fourth group zoom lens having, in order form an object side to an image side, a first, a second, a third and a fourth lens unit respectively having a negative, a positive, a negative and a positive refractive power and moving a part of the second lens unit in a direction perpendicular to an optical axis so as to correct an image blurring.

U.S. Pat. No. 8,189,074 discloses a fifth group zoom lens having, in order form an object side to an image side, a first, a second, a third, a fourth and a fifth lens unit respectively having a negative, a positive, a positive, a negative and a positive refractive power and moving the fourth lens unit in a direction perpendicular to an optical axis so as to correct an image blurring.

SUMMARY OF THE INVENTION

The present invention provides a small size in an entire lens system and a wide angle of view zoom lens capable of making a variation in aberrations when correcting the image blurring smaller and maintaining a high optical performance during vibration control.

A zoom lens as one aspect of the present invention includes, in order from an object side to an image side, a first lens unit having a negative refractive power, a second lens unit having a positive refractive power, and a rear unit including a plurality of lens units. A distance between adjacent lens units changes during zooming. An aperture stop is arranged on an image side of the first lens unit. An image stabilizing unit Ls comprising at least part of the second lens unit moves in a direction perpendicular to an optical axis during blurring correction. The following conditions are satisfied:

$$1.30 < f_{Ls}/f_W < 10.00$$

$$2.00 < T_{Exp}/f_W < 5.00$$

where $f_{Ls}$ represents a focal length of the image stabilizing unit Ls, $T_{Exp}$ represents a distance between an exit pupil and an image surface at a wide angle end, and $f_w$ represents a focal length of an entire system at the wide angle end.

Further features of the present invention will become apparent from the following description of exemplary embodiments (with reference to the attached drawings).

DESCRIPTION OF THE EMBODIMENTS

A detailed description will be given of an embodiment of the present invention with reference to be the accompanying drawings. A zoom lens of the present invention comprises, in order from an object side to an image side, a first lens unit having a negative refractive power, and a rear unit including a plurality of lens units and a distance between adjacent lens units changes during zooming. An aperture stop is arranged on an image side of the first lens unit, and an image stabilizing unit Ls comprising at least part of the second lens unit moves in a direction perpendicular to an optical axis (a direction nonparallel to the optical axis direction) during blurring correction.

Figure 14A:
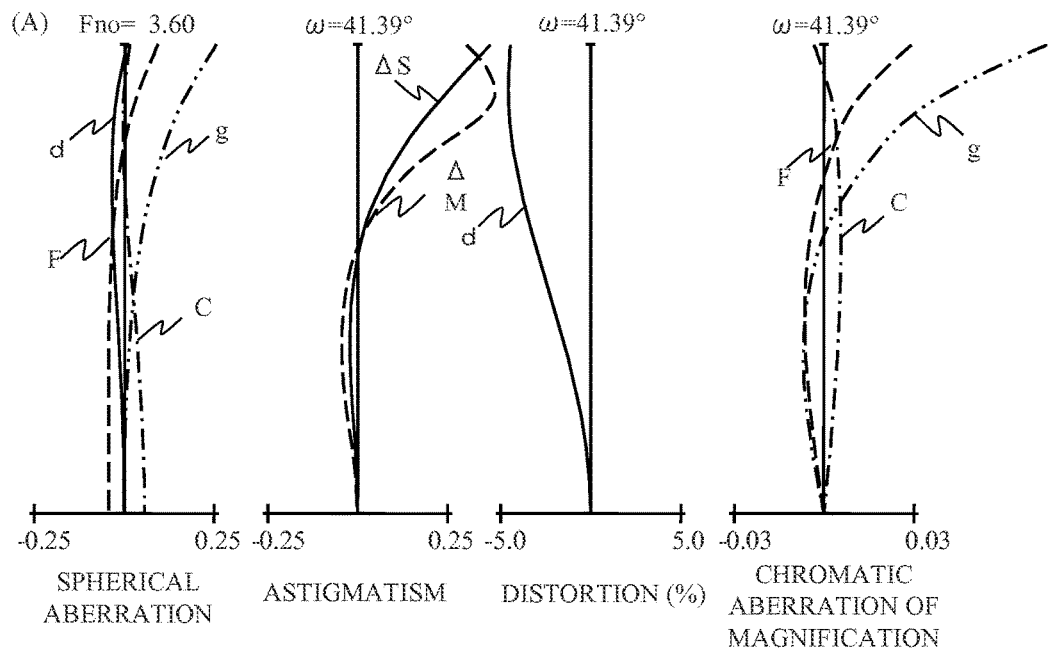
FIG. 14A and FIG. 14B are longitudinal aberration diagrams at a wide angle end and a telephoto end of the zoom lens according to the embodiment 7 when focusing at infinity.
Figure 14B:
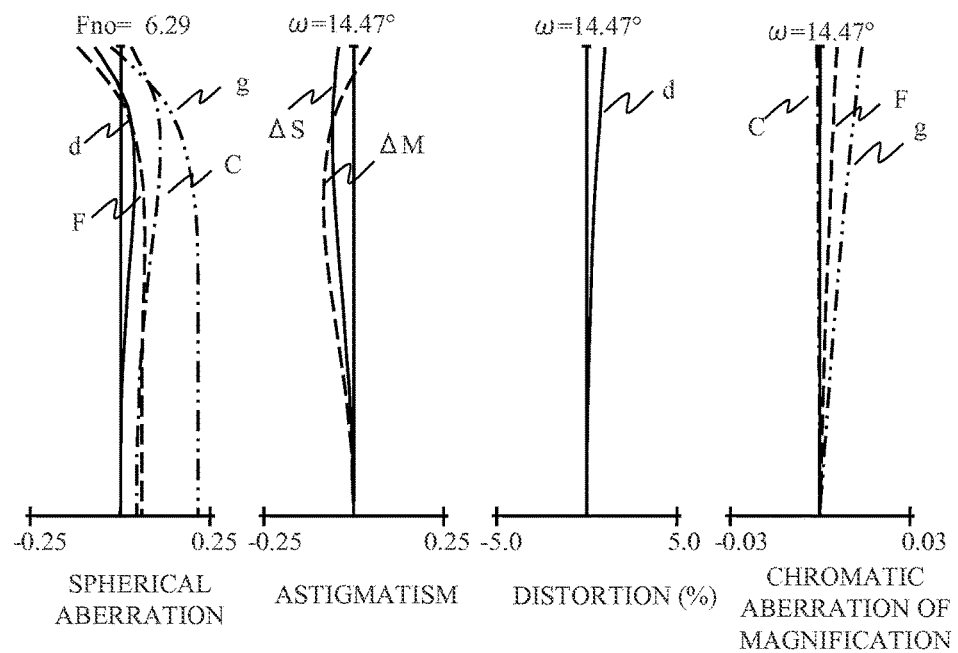
Figure 15:
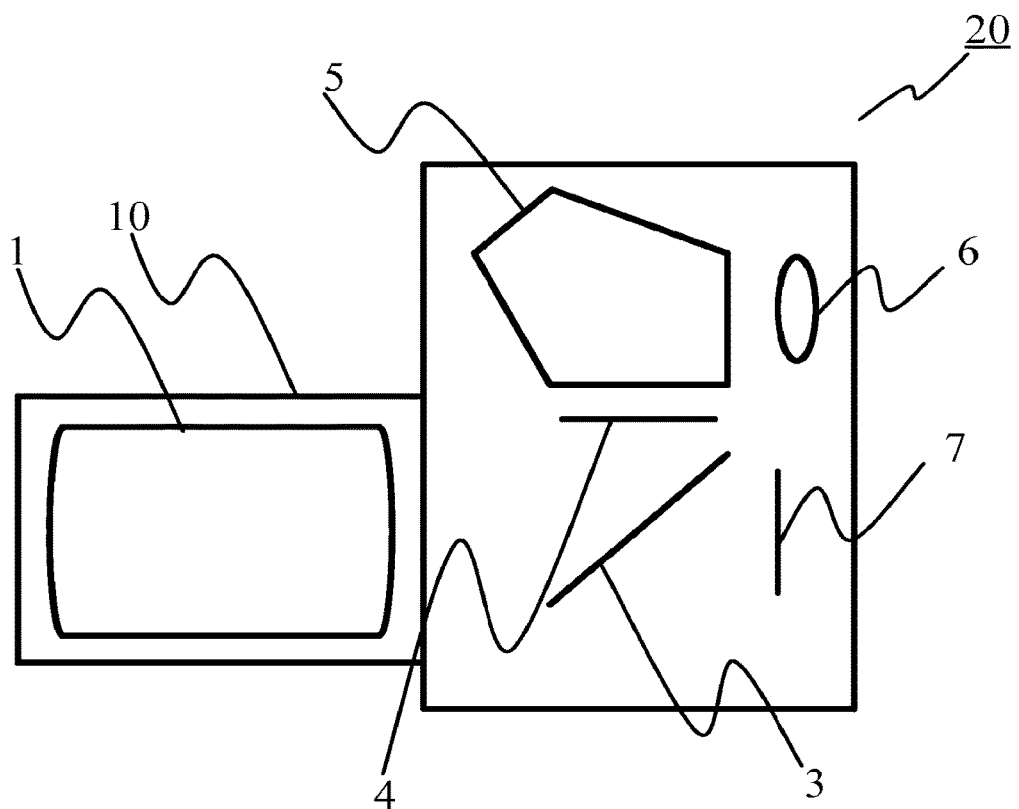
FIG. 15 is a schematic diagram of a main part of an image pickup apparatus of the present invention.

FIG. 1, FIG. 3, FIG. 5, FIG. 7, FIG. 9, FIG. 11, and FIG. 13 are sectional views at a wide angle end (a short focal length end) of the zoom lens according to embodiments 1 to 7 of the present invention. FIG. 2A, FIG. 4A, FIG. 6A, FIG. 8A, FIG. 10A, FIG. 12A, and FIG. 14A are longitudinal aberration diagrams at the wide angle end of the zoom lens according to the embodiments 1 to 7 when focusing at infinity, and FIG. 2B, FIG. 4B, FIG. 6B, FIG. 8B, FIG. 10B, FIG. 12B, and FIG. 14B are longitudinal aberration diagrams at a telephoto end (a ling focal length end) of the zoom lens according to the embodiments 1 to 7 when focusing at infinity. FIG. 15 is a schematic diagram of a main part of an image pickup apparatus of the present invention.

A zoom lens according to each embodiment is an image pickup optical system used for an image pickup apparatus such as a video camera, a digital camera, and a silver-halide film camera. In the sectional view of the lens, the left side is an object side (forward), and the right side is an image side (backward). The zoom lens according to each embodiment may be used as a projector, and then, the left side becomes a screen side and the right side becomes a projected image side. In the sectional view of the lens, OL denotes a zoom lens. i denotes an order of the zoom lens from the object side and Li denotes the i-th lens unit. LR denotes a rear unit including a plurality of lens units.

In the embodiments 1 to 5, the rear unit LR comprises, in order from the object side to the image side, a third lens unit having a negative refractive power and a fourth lens unit having a positive refractive power. In the embodiments 6 and 7, the rear unit LR comprises a third lens unit having a positive refractive power, a fourth lens unit having a negative refractive power and a fifth lens unit having a positive refractive power. Ls is an image stabilizing unit which comprises at least part of the second lens unit L2 and moves an imaging position in a direction perpendicular to an optical axis by moving in a direction perpendicular to the optical axis. The image stabilizing unit Ls decreases an image blurring generated when the zoom lens vibrates.

SP denotes an aperture stop (a maximum f-number) and is arranged on a position adjacent to an image side of the image stabilizing unit Ls. IP denotes an image surface, corresponds to an image pickup plane of a solid image pickup element (a photoelectric conversion element) such as a CCD sensor and a CMOS sensor when using as an image pickup optical system of a video camera and a digital camera, and corresponds to a film plane when using as a silver-halide film camera. OA denotes an optical axis of the zoom lens OL.

The arrow in figures indicates a moving direction during zooming from the wide angle end to the telephoto end. In the embodiments 1 to 4, the first lens unit L1 moves to the image side along a locus concave, and the second, the third and the fourth lens unit L2-L4 move to the object side during zooming from the wide angle end to the telephoto end. In the embodiments 5, the first lens unit L1 moves to the image side along a locus concave, and the second lens unit L2 and the third lens unit L3 moves to the object side during zooming from the wide angle end to the telephoto end. In the embodiments 6 and 7, the first lens unit L1 moves to the image side along a locus concave, and the second, the third, the fourth and the fifth lens unit L2-L5 move to the object side during zooming from the wide angle end to the telephoto end.

In aberration diagrams, d (a solid line), g (a chain double-dashed line), C (a chain line) and F (a solid line) denote a d line, a g line, a C line and a F line, respectively. ΔM and ΔS denote a meridional image surface and a sagittal image surface of the d-line, respectively. Additionally, the distortion is represented by the d-line. Further, Fno denotes a f-number and ω denotes an image pickup half angle of view (degrees).

The zoom lens of each embodiment comprises, in order from the object side to the image side, a first lens unit L1 having a negative refractive power and a second lens unit L2 having a positive refractive power. Further, an aperture stop SP is formed in the second lens unit L2 or on an image side than the second lens unit L2. Additionally, image stabilizing is controlled by moving an entire second lens unit L2 or a part of the image stabilizing unit Ls in a direction perpendicular to the optical axis. In each embodiment, $f_{Ls}$ represents a focal length of the image stabilizing unit Ls, $T_{Exp}$, represents a distance between an exit pupil and the image surface at the wide angle end, and $f_w$ represents a focal length of an entire system at the wide angle end. Then, the following conditions are satisfied:

$$1.30 < f_{Ls}/f_W < 10.00 \quad (1)$$

$$2.00 < T_{Exp}/f_W < 5.00 \quad (2)$$

The condition (1) prescribes the ratio between the focal length $f_{Ls}$ of the image stabilizing unit Ls and the focal length of the entire system at the wide angle end. The condition (1) relates to an image stabilizing function. Though the refractive power of the image stabilizing unit Ls would be weak so as to successfully maintain an optical performance during vibration control, an image stabilizing sensitivity is smaller. As a result, a moving amount of the image stabilizing unit Ls for correcting the predetermined amount of image blurring is larger, and the driving apparatus so as to drive the image stabilizing unit Ls grows in size. Conversely, when the refractive power of the image stabilizing unit Ls is stronger, the image stabilizing sensitivity is larger and the moving amount of the image stabilizing unit Ls during vibration control is smaller, but it is difficult to successfully maintain the optical performance.

If the upper limit of the condition (1) is exceeded, it is unfavorable since the refractive power of the image stabilizing unit Ls is weaker and the driving apparatus grows in size. Additionally, if the lower limit of the condition (1) is fallen below, it is difficult to maintain high optical performance since the refractive power of the image stabilizing unit Ls is stronger. The condition (2) prescribes the ratio of the focal length of the entire system in respect to a distance $T_{Exp}$ between an exit pupil and the image surface at the wide angle end. The condition (2) is a condition so as to successfully maintain the optical performance during vibration control and to make the image stabilizing unit Ls small. The image stabilizing unit Ls may be arranged near the aperture stop SP so as to successfully maintain the optical performance during vibration control.

On the other hand, the size of the aperture stop SP correlates with an exit pupil distance. If the exit pupil distance is long, the positive refractive power of the lens unit on the image side than the aperture stop SP is strong or a distance between the aperture stop SP and the image surface is far. As a result, the aperture stop SP is easy to grow in size.

Conversely, if the exit pupil distance is short, the positive refractive power of the lens unit on the image side than the aperture stop SP or a distance between an aperture stop SP and the image surface is short. As a result, an effective diameter can also maintain comparatively small. Naturally, the image stabilizing unit is arranged near the aperture stop SP, the size of the image stabilizing unit Ls is determined according to the size of the aperture stop SP. In other words, when the aperture stop SP is large, the image stabilizing unit Ls grows in size and, as a result the entire apparatus grows in size. Therefore, the exit pupil distance should be properly set so that the image stabilizing unit is arranged near the aperture stop SP, the optical performance is successfully maintained, and the effective diameter is prevented to grow in size.

Condition (2) shows the range. If the upper limit of the condition (2) is exceeded, it is not preferable since the exit pupil distance is longer and the image stabilizing unit Ls grows in size. Conversely, if the lower limit of the condition (2) is exceeded, it is difficult to arrange the driving apparatus driving the aperture stop SP since a distance between the aperture stop SP and the image surface is too short.

The conditions (1) and (2) are necessary so as to preferably maintain the optical performance during vibration control and miniaturize the image stabilizing unit Ls, in other words, the entire apparatus. It is more preferred that the numeral ranges of the conditions (1) and (2) satisfy the following numeral ranges.

$$1.40 < f_{Ls}/f_W < 8.00 \quad (1a)$$

$$2.20 < T_{Exp}/f_W < 5.00 \quad (2a)$$

It is more preferred that the numeral ranges of the conditions (1a) and (2a) satisfy the following numeral ranges.

$$4.00 < f_{Ls}/f_W < 8.00 \quad (1b)$$

$$2.50 < T_{Exp}/f_W < 4.00 \quad (2b)$$

In each embodiment, the wide angle of view zoom lens having the high optical performance in the entire zoom range and making a variation in aberrations when controlling the vibration smaller is acquired by specifying each component. In the zoom lens in each embodiment, it is preferable to satisfy one or more following conditions so as to acquire a small size in the entire lens system and a wide angle of view zoom lens having high optical performance.

The aperture stop SP is arranged on a position adjacent to the image side of the image stabilizing unit Ls, and $T_{lsmin}$ represents a minimum value of a distance between the first lens unit L1 and the aperture stop SP within the entire zoom range. The image stabilizing unit Ls comprises a positive lens, and $vd_{LS}$ represents the Abbe number of the positive lens. $BF_w$ represents a back focus at the wide angle end. $Y_{max}$ represents a maximum image height when using the zoom lens of each embodiment for the image pickup apparatus having a photoelectric conversion element (a solid image pickup element). Then, it is preferable that one or more following conditions are satisfied.

$$0.30 < T_l smin/fw < 1.00 \quad (3)$$

$$35.0 < vd_{Ls} \quad (4)$$

$$BFW/f_W < 1.6 \quad (5)$$

$$BFW/Y_{max} < 1.8 \quad (6)$$

Condition (3) is a normalized value dividing a minimum distance on an axis between the first lens unit L1 and the aperture stop SP during zooming into the focal length in the entire system at the wide angle end. Condition (3) relates to an arrangement space of the image stabilizing unit Ls. It is necessary to arrange a lens holding flame and a driving system driving the lens holding flame (hereinafter referred to as "an image stabilizing apparatus" including them) around the image stabilizing unit Ls so as to move the image stabilizing unit Ls in a direction perpendicular to the optical axis. Therefore, a certain level of a space is needed so as to arrange the image stabilizing unit Ls.

If the upper limit of the condition (3) is exceeded, the space arranging the image stabilizing apparatus is fully secured, but it is not preferable since the zoom lens grows in size. If the lower limit of the condition (3) is exceeded, it is not preferable since it is difficult to arrange the image stabilizing apparatus and the image stabilizing unit Ls. It is more preferable that the condition (3) satisfies the following range.

$$0.40 < T_{lsmin}/f_w < 0.90 \quad (3a)$$

More preferably, the following range is satisfied.

$$0.60 < T_{lsmin}/f_w < 0.90 \quad (3b)$$

Condition (4) relates to an optical performance during vibration control. Generally, when a single lens is decentered in parallel, chromatic aberration of magnification generates. When the material of the single lens has higher dispersion, the chromatic aberration of magnification becomes larger. Therefore, it is preferable that the single lens is made by low dispersion glass satisfying the condition (4) so as to maintain high optical performance when vibration control is performed by the single lens. It is more preferable that the condition (4) satisfies the following range.

$$45.0 < vd_{Ls} \quad (4a)$$

More preferably, the following range is satisfied.

$$50.0 < vd_{Ls} \quad (4b)$$

Condition (5) is a normalized value dividing the back focus Bfw at the wide angle end into the focal length in the entire system at the wide angle end, if the upper limit of the condition (5) is exceeded, it is not preferable since the back focus is larger and the entire system grows in size. It is more preferable that condition (5) satisfies the following range.

$$0.7 < BF_W/f_W < 1.5 \quad (5a)$$

More preferably, the following range is satisfied.

$$0.8 < BF_W/f_W < 1.1 \quad (5b)$$

Condition (6) is a ratio of the back focus of the zoom lens and the maximum image height when using the zoom lens for the image-pickup apparatus. If the upper limit of the condition (6) is exceeded, it is not preferable since the back focus is relatively longer, and as a result, the entire system grows in size. Additionally, the exit pupil distance tends to be longer, and therefore, it is not preferable since the power arrangement of the retrofocus type increases and distortions, especially, field curvature increases. It is more preferable that condition (6) satisfies the following range.

$$0.7 < BF_W/Y_{max} < 1.5 \quad (6a)$$

More preferably, the following range is satisfied.

$$0.75 < BF_W/Y_{max} < 1.2 \quad (6b)$$

The optical system of each embodiment of the present invention prevents the image stabilizing apparatus from growing in size since the image stabilizing lens unit comprises a positive lens and the weight thereof is smaller.

The zoom lens of each embodiment of the present invention comprises a lens unit for focusing on the image side of the aperture stop SP. In other words, the zoom lens of each embodiment of the present invention comprises the image stabilizing unit Ls, which includes, in order form the object side to the image side, a first lens unit having a negative refractive power and the entire second lens unit or a part of the second lens unit, and the aperture stop SP arranged on the image side of the image stabilizing unit Ls. Further, the zoom lens comprises the lens unit for focusing arranged on the image side of the aperture stop SP.

Since the image stabilizing unit Ls, the aperture stop SP and the lens unit for focusing moves during taking an image and include each driving member driving them, a space is needed for arranging each driving member. Hereinafter, the image stabilizing unit Ls, the aperture stop SP, and the focusing lens along with each driving member and a holding member are referred to an image stabilizing apparatus, an aperture stop apparatus, and a focusing apparatus, respectively Since the image stabilizing apparatus moves the image stabilizing unit in a direction perpendicular to the optical axis, a certain space which positions in a direction perpendicular to the optical axis is needed and a diameter of the entire apparatus tends to be larger in the three apparatus. Meanwhile, a lot of space along an optical axis direction is not needed.

Since the aperture stop apparatus also moves the aperture stop SP in a direction where the aperture stop becomes larger or smaller, in other words, a direction perpendicular to the optical axis, a certain space along a direction perpendicular to the optical axis is needed. However, since the movable range is within a range of original effective light flux, the space is smaller than the space which the image stabilizing unit needs and the diameter of the entire apparatus is also smaller than that of the image stabilizing apparatus. Additionally, a lot of space along the optical axis direction is not needed. Since the focusing apparatus moves the lens unit for focusing in the optical axis direction, a space along the optical axis direction is need and a lot of space along a direction perpendicular to the optical axis is not needed.

The image stabilizing apparatus, the aperture stop apparatus, and the focusing apparatus have each characteristic. In the image pickup apparatus, electronic substrates so as to control each apparatus are arranged and they all are arranged on a position apart from a direction perpendicular to the optical axis so as not to interrupt an image pickup light flux. Additionally, since they need to connect with fixed lines, it is difficult to arrange a part where the optical system brings up by zooming and, necessarily, they arranged on the image surface side.

In other words, it is difficult to arrange a large diameter apparatus on a position near the image surface, and if the large diameter apparatus is arranged on the image side, it is not preferable since the entire image pickup apparatus grows in size. Therefore, it is preferable that the large diameter apparatus is arranged on the object side so as to keep small image pickup apparatus, and if, in order from the object side, the image stabilizing apparatus, the aperture stop apparatus, and the focusing apparatus are arranged, it is easy to effectively use a space and acquire small image pickup apparatus.

Next, the lens construction of each embodiment is described. Hereafter, the zoom lens OL of the embodiment 1 of the present invention is described referring to FIG. 1.

The focal length of the zoom lens of the embodiment 1 is from 11.0 mm to 22.0 mm. The zoom lens OL comprises a first lens unit L1 having a negative refractive power, a second lens unit L2 having a positive refractive power, a third lens unit L3 having a negative refractive power and a fourth lens unit L4 having a positive refractive power. The second lens unit L2 includes an image stabilizing unit Ls on the most object side and an aperture stop SP on the image side adjacent to the image stabilizing unit Ls. In addition, the third lens unit L3 arranged on the image side of the second lens unit L2 is a lens unit for focusing (a focus lens unit) and moves along the optical axis during focusing.

The focal length of entire system at the wide angle end is 11.00 mm, the focal length of the image stabilizing unit Ls is 71.75 mm and the distance TExp between the exit pupil and the image surface as 36.42 mm. In this zoom lens, a value normalized the focal length of the image stabilizing unit Ls indicated in the condition (1) by the focal length of the entire system at the wide angle end is 6.52 and a value normalized the exit pupil distance indicated in condition (2) by the focal length of the entire system at the wide angle end is 3.31.

Figure 1:
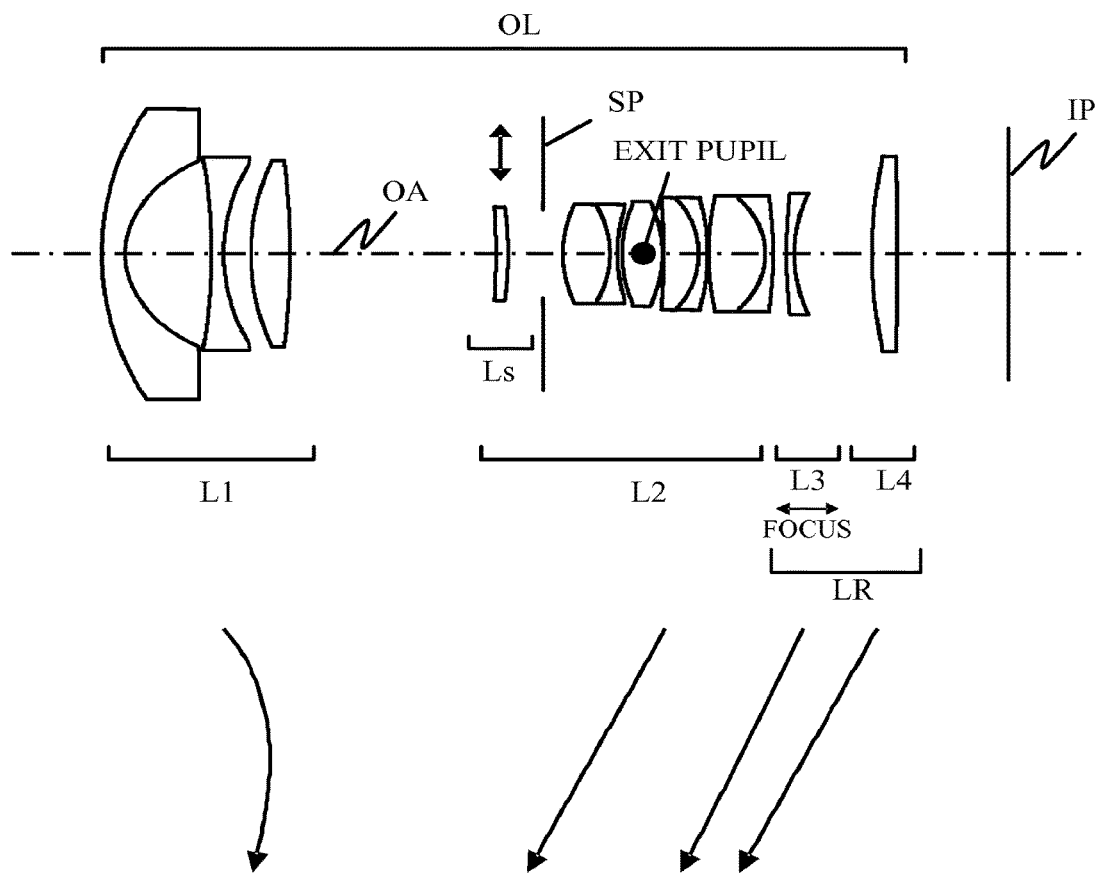
FIG. 1 is a sectional view at a wide angle end of a zoom lens according to an embodiment 1.
Figure 2A:
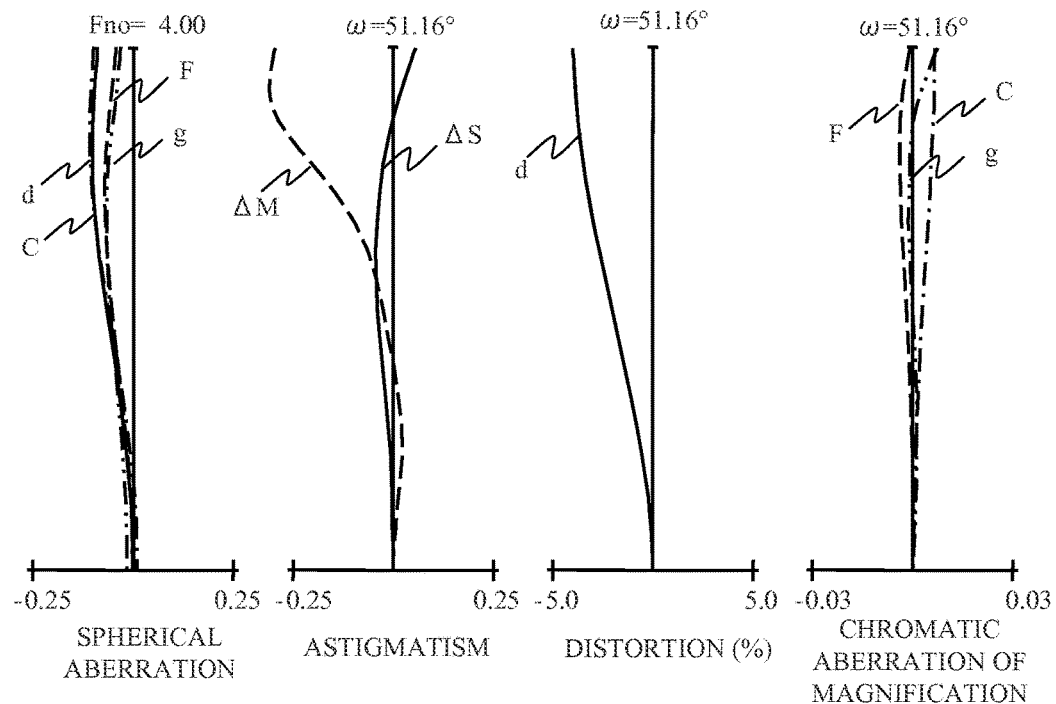
FIG. 2A and FIG. 2B are longitudinal aberration diagrams at a wide angle end and a telephoto end of the zoom lens according to the embodiment 1 when focusing at infinity.
Figure 2B:
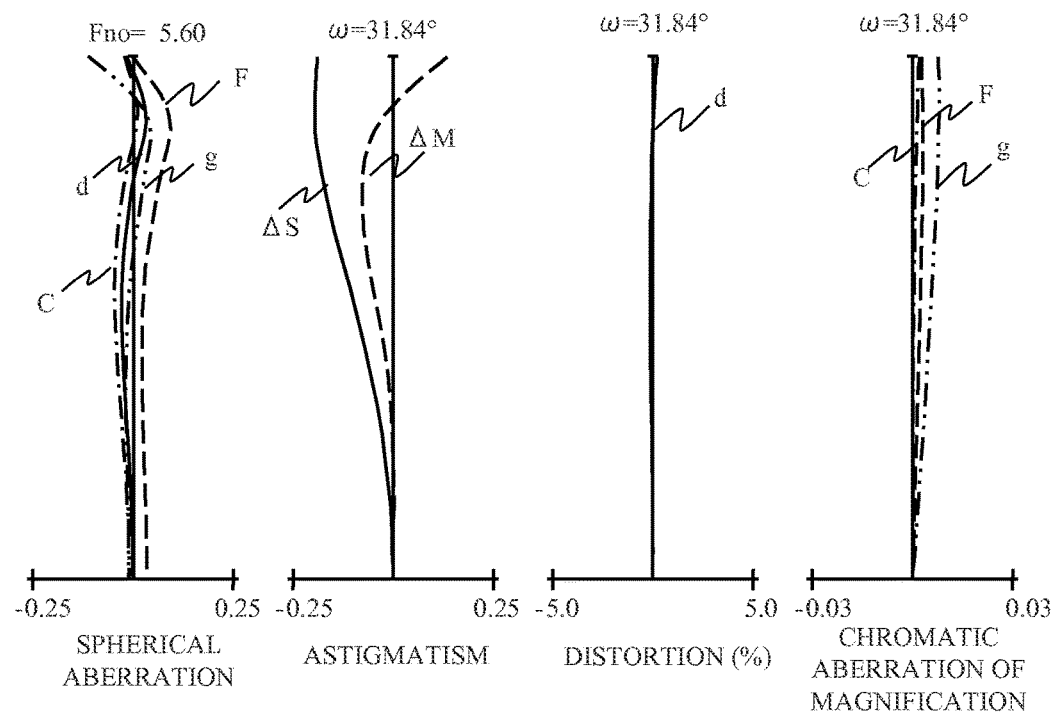

The zoom lens of the embodiment 1 makes the image pickup angle of view 2ω at the wide angle end 102.3° by the above power arrangement. Additionally, as illustrated in FIGS. 2A and 2B, distortions such as spherical aberration, comatic aberration, field curvature and distortion aberration are successfully corrected. Therefore, in the zoom lens of the embodiment 1, a low variation of the optical performance during vibration control and a high optical performance lens is acquired by properly setting the exit pupil distance and the refractive power of the image stabilizing unit Ls. Further, a small zoom lens effectively utilized the space by arranging the image stabilizing unit Ls, the aperture stop SP and the focal lens unit in order from the object side is acquired.

Figure 3:
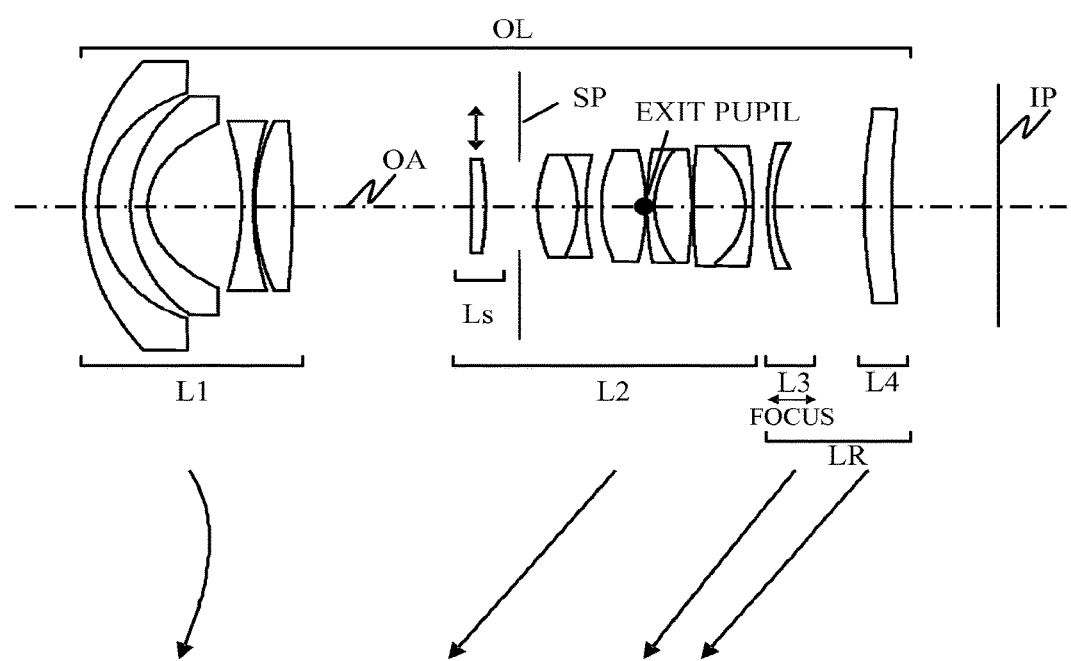
FIG. 3 is a sectional view at a wide angle end of a zoom lens according to an embodiment 2.

Hereafter, the zoom lens OL of the embodiment 2 of the present invention is described referring to FIG. 3. The focal length of the zoom lens of the embodiment 2 is from 12.0 mm to 23.7 mm. The zoom lens OL comprises a first lens unit L1 having a negative refractive power, a second lens unit L2 having a positive refractive power, a third lens unit L3 having a negative refractive power and a fourth lens unit L4 having a positive refractive power. The second lens unit L2 includes an image stabilizing unit Ls on the most object side and an aperture stop SP on the image side adjacent to the image stabilizing unit Ls. In addition, the third lens unit L3 arranged on the image side of the second lens unit L2 is a focus lens unit and moves along the optical axis during focusing.

The focal length of entire system at the wide angle end is 12.03 mm, the focal length of the image stabilizing unit Ls is 73.34 mm and the distance $T_{Exp}$ between the exit pupil and the image surface as 36.92 mm. In this zoom lens, a value normalized the focal length of the image stabilizing unit Ls indicated in the condition (1) by the focal length of the entire system at the wide angle end is 6.10 and a value normalized the exit pupil distance indicated in condition (2) by the focal length of the entire system at the wide angle end is 3.07.

Figure 4A:
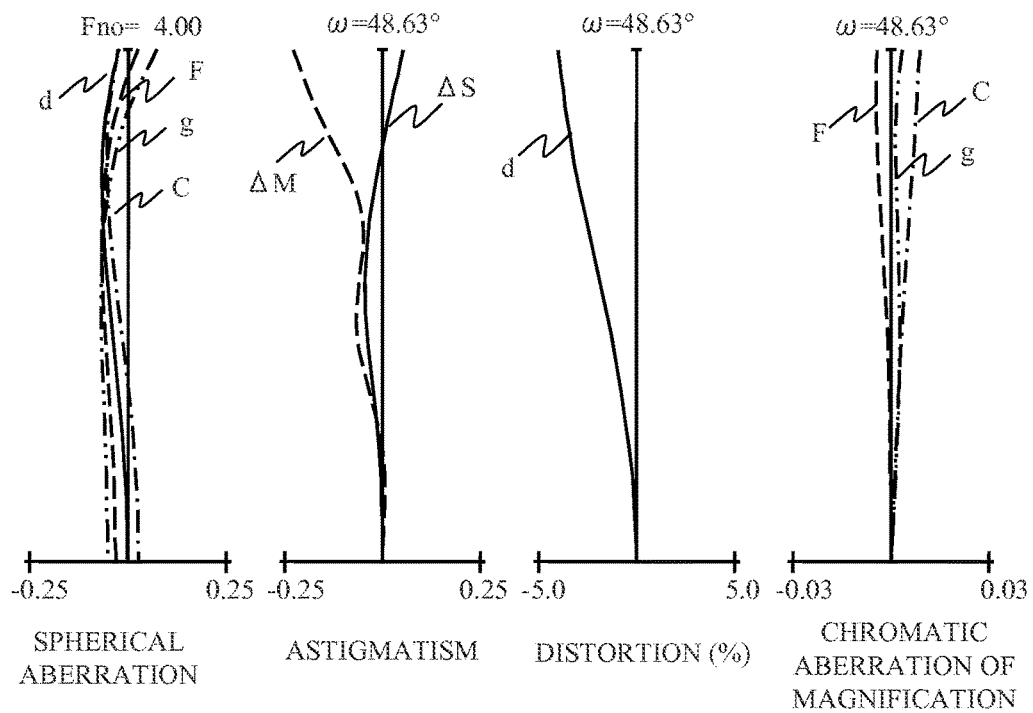
FIG. 4A and FIG. 4B are longitudinal aberration diagrams at a wide angle end and a telephoto end of the zoom lens according to the embodiment 2 when focusing at infinity.
Figure 4B:
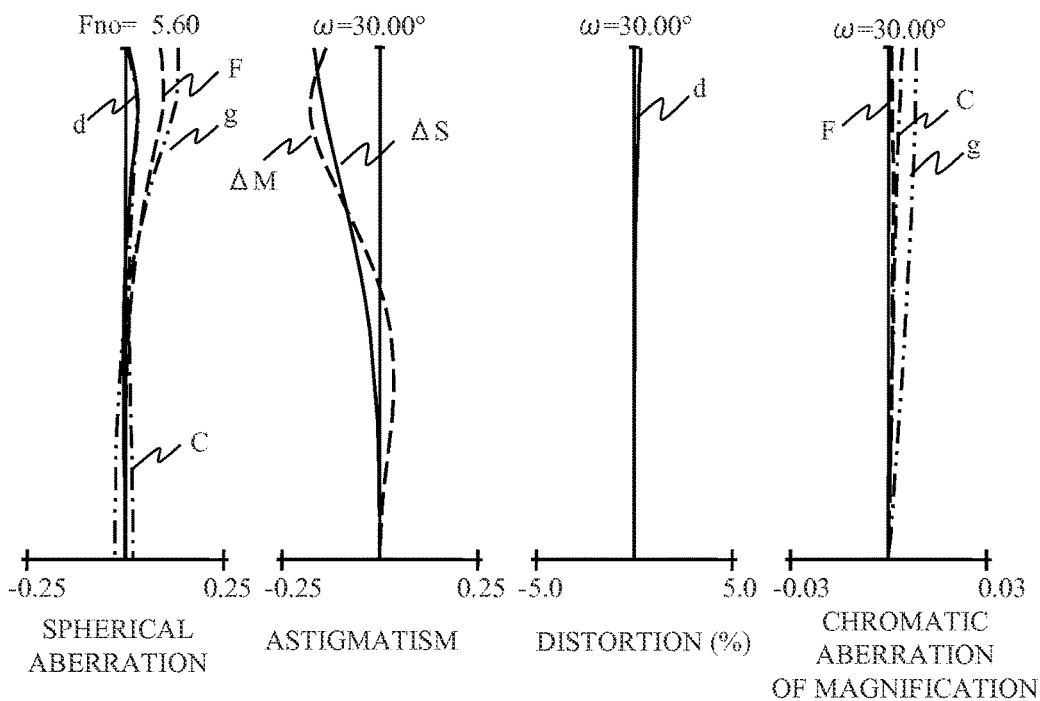

The zoom lens of the embodiment 2 makes the image pickup angle of view 2ω at the wide angle end 102.3° by the above power arrangement. Additionally, as illustrated in FIGS. 4A and 4B, distortions such as spherical aberration, comatic aberration, field curvature and distortion aberration are successfully corrected. Therefore, in the zoom lens of the embodiment 2, a low variation of the optical performance during vibration control and a high optical performance lens is acquired by properly setting the exit pupil distance and the refractive power of the image stabilizing unit Ls. Further, a small zoom lens effectively utilized the space by arranging the image stabilizing unit Ls, the aperture stop SP and the focal lens unit in order from the object side is acquired.

Figure 5:
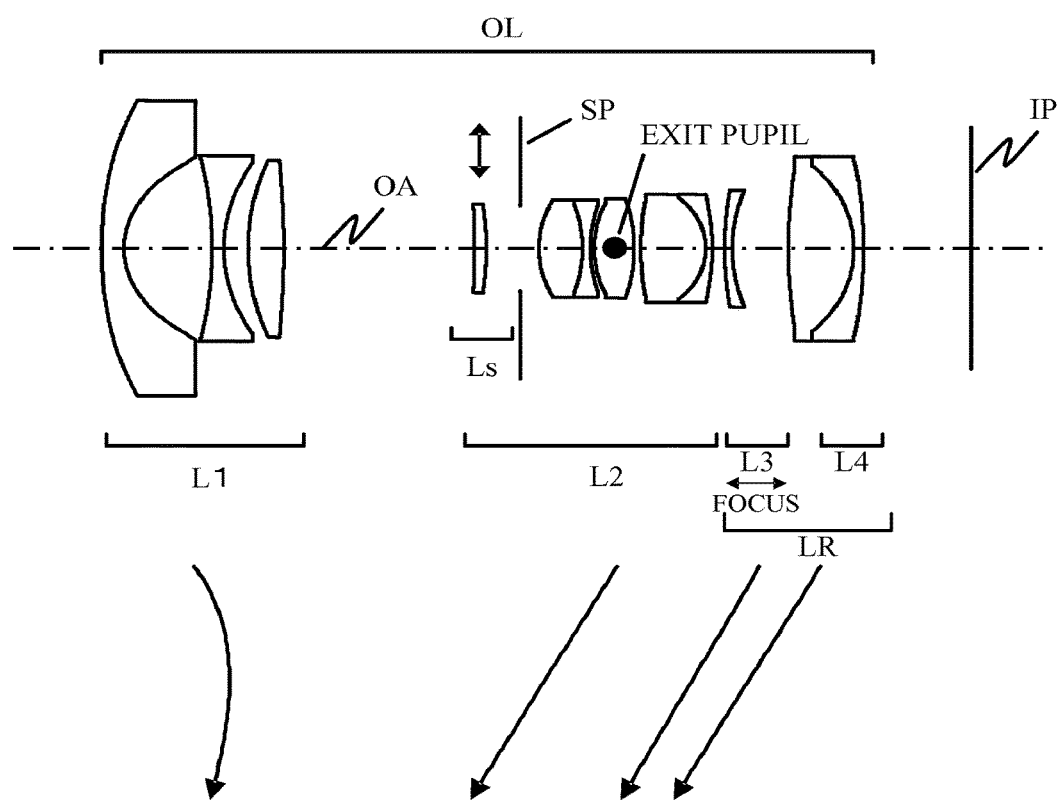
FIG. 5 is a sectional view at a wide angle end of a zoom lens according to an embodiment 3.

Hereafter, the zoom lens OL of the embodiment 3 of the present invention is described referring to FIG. 5. The focal length of the zoom lens of the embodiment 3 is from 11.0 mm to 22.0 mm. The zoom lens OL comprises a first lens unit L1 having a negative refractive power, a second lens unit L2 having a positive refractive power, a third lens unit L3 having a negative refractive power and a fourth lens unit L4 having a positive refractive power. The second lens unit L2 includes an image stabilizing unit Ls on the most object side and an aperture stop SP on the image side adjacent to the image stabilizing unit Ls. In addition, the third lens unit L3 arranged on the image side of the second lens unit L2 is a focus lens unit and moves along the optical axis during focusing.

The focal length of entire system at the wide angle end is 11.00 mm, the focal length of the image stabilizing unit Ls is 73.41 mm and the distance $T_{Exp}$ between the exit pupil and the image surface as 36.54 mm. In this zoom lens, a value normalized the focal length of the image stabilizing unit Ls indicated in the condition (1) by the focal length of the entire system at the wide angle end is 6.67 and a value normalized the exit pupil distance indicated in condition (2) by the focal length of the entire system at the wide angle end is 3.32.

Figure 6A:
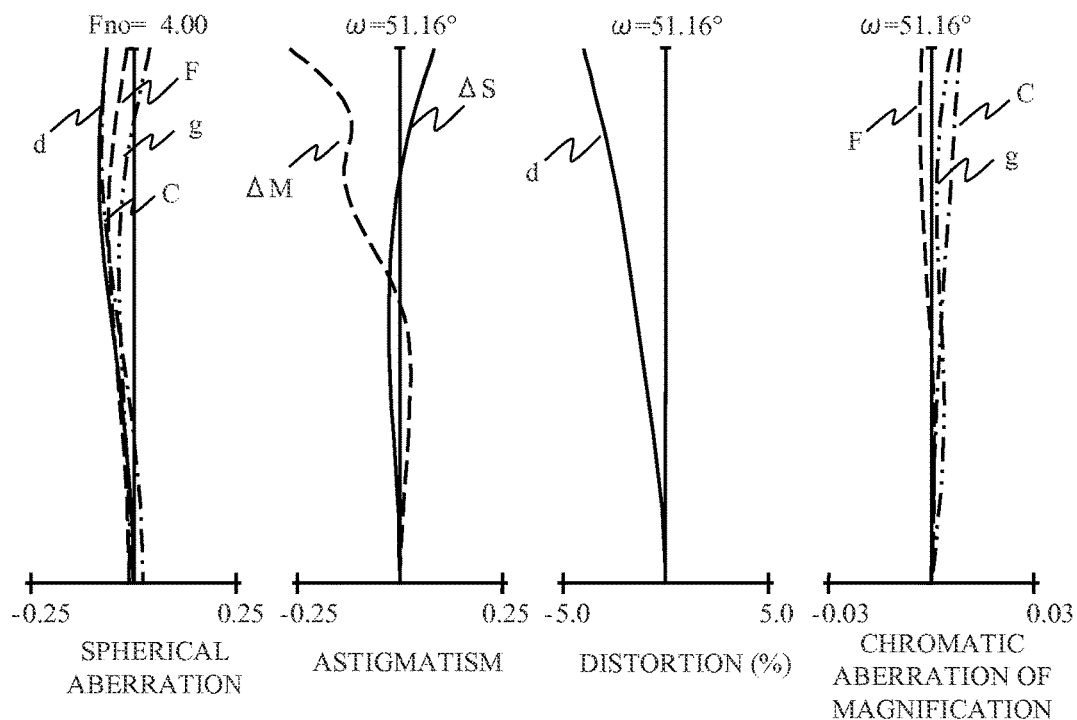
FIG. 6A and FIG. 6B are longitudinal aberration diagrams at a wide angle end and a telephoto end of the zoom lens according to the embodiment 3 when focusing at infinity.
Figure 6B:
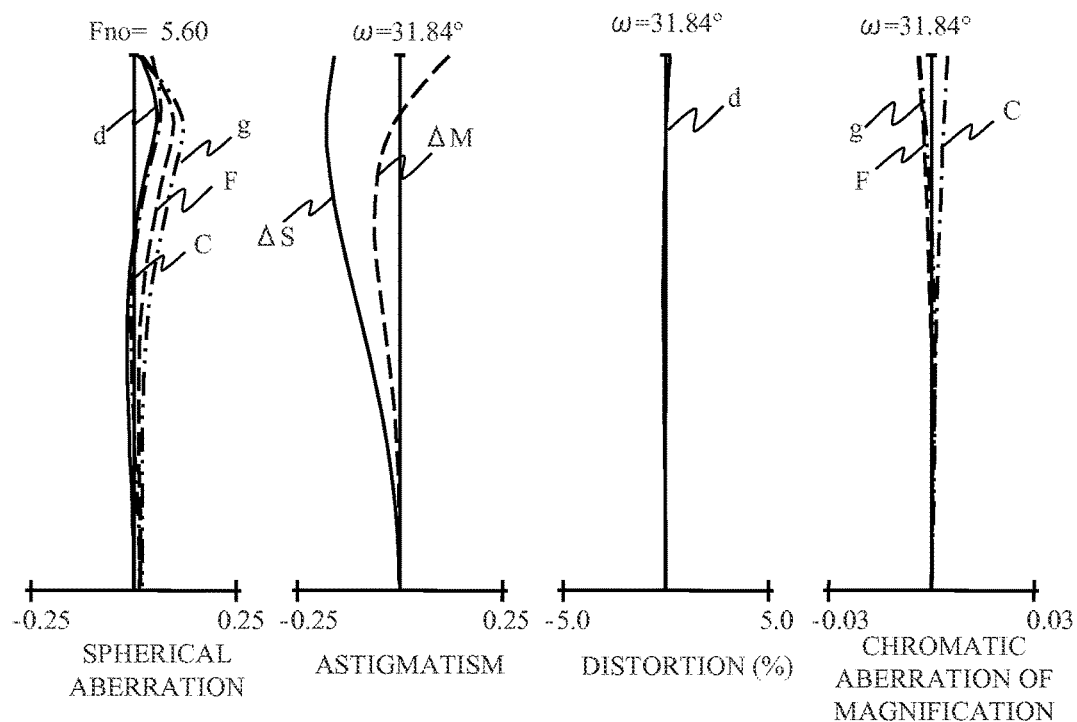

The zoom lens of the embodiment 3 makes the image pickup angle of view 2ω at the wide angle end 102.3° by the above power arrangement. Additionally, as illustrated in FIGS. 6A and 6B, distortions such as spherical aberration, comatic aberration, field curvature and distortion aberration are successfully corrected. Therefore, in the zoom lens of the embodiment 3, a low variation of the optical performance during vibration control and a high optical performance lens is acquired by properly setting the exit pupil distance and the refractive power of the image stabilizing unit Ls. Further, a small zoom lens effectively utilized the space by arranging the zoom lens Ls, the aperture stop SP and the focal lens unit in order from the object side is acquired.

Figure 7:
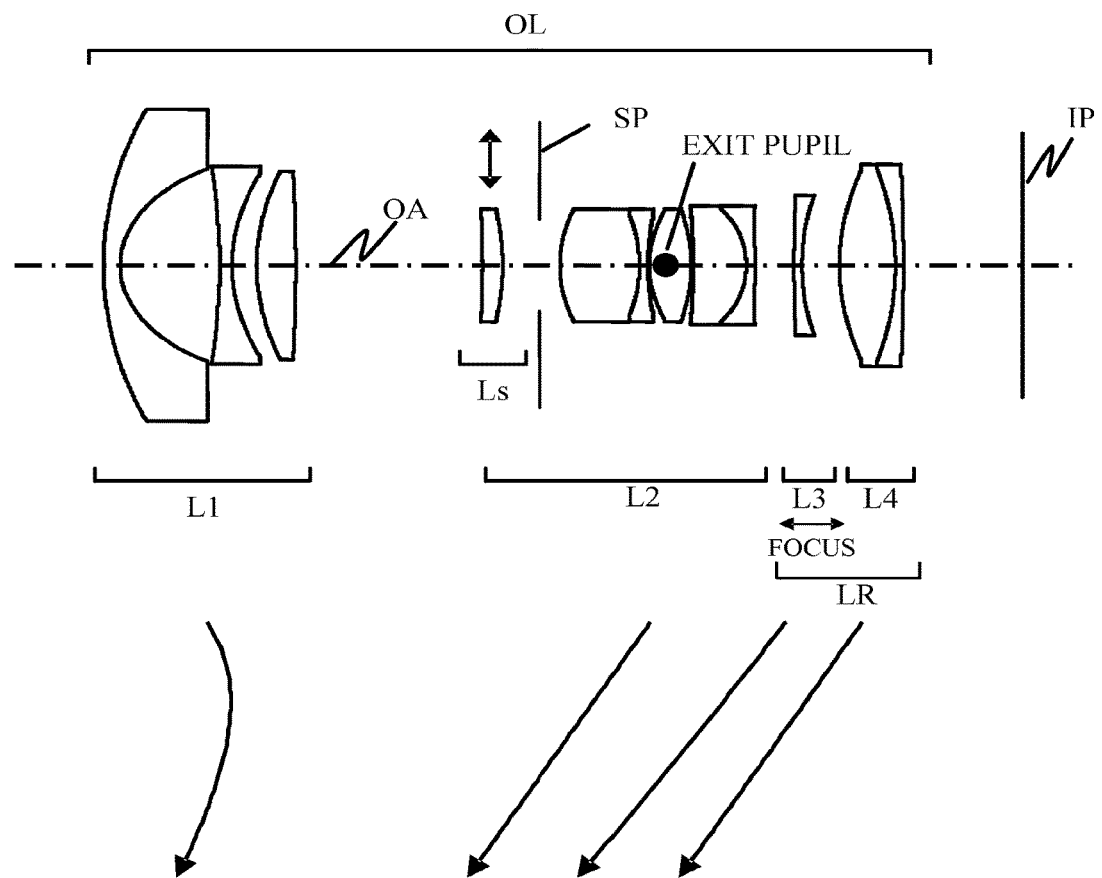
FIG. 7 is a sectional view at a wide angle end of a zoom lens according to an embodiment 4.

Hereafter, the zoom lens OL of the embodiment 4 of the present invention is described referring to FIG. 7. The focal length of the zoom lens of the embodiment 4 is from 11.0 mm to 22.0 mm. The zoom lens OL comprises a first lens unit L1 having a negative refractive power, a second lens unit L2 having a positive refractive power, a third lens unit L3 having a negative refractive power and a fourth lens unit L4 having a positive refractive power. The second lens unit L2 includes an image stabilizing unit Ls on the most object side and an aperture stop SP on the image side adjacent to the image stabilizing unit Ls. In addition, the third lens unit L3 arranged on the image side of the second lens unit L2 is a focus lens unit and moves along the optical axis during focusing.

The focal length of entire system at the wide angle end is 11.00 mm, the focal length of the image stabilizing unit Ls is 72.47 mm and the distance $T_{Exp}$ between the exit pupil and the image surface as 34.69 mm. In this zoom lens, a value normalized the focal length of the image stabilizing unit Ls indicated in the condition (1) by the focal length of the entire system at the wide angle end is 6.59 and a value normalized the exit pupil distance indicated in condition (2) by the focal length of the entire system at the wide angle end is 3.15.

Figure 8A:
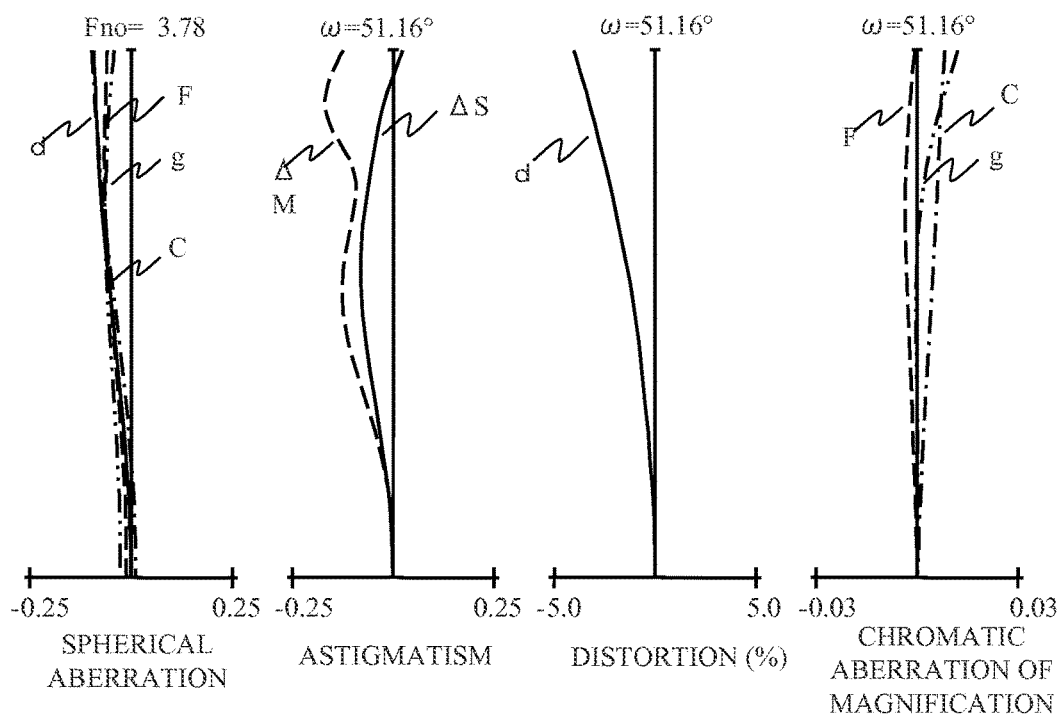
FIG. 8A and FIG. 8B are longitudinal aberration diagrams at a wide angle end and a telephoto end of the zoom lens according to the embodiment 4 when focusing at infinity.
Figure 8B:
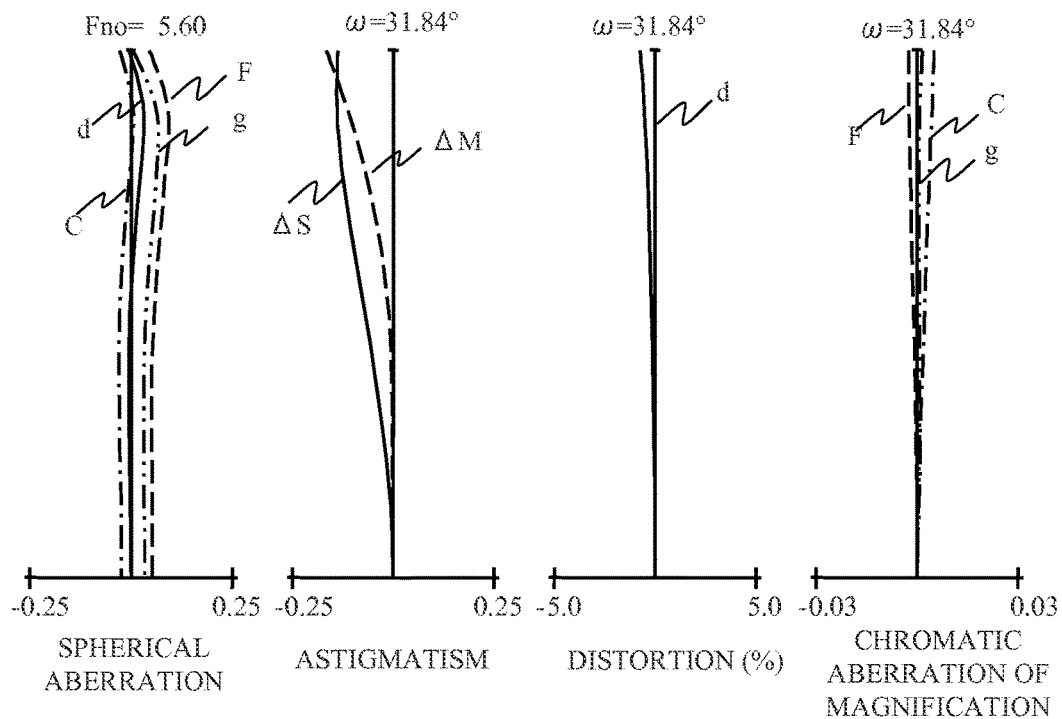

The zoom lens of the embodiment 4 makes the image pickup angle of view 2ω at the wide angle end 102.3° by the above power arrangement. Additionally, as illustrated in FIGS. 8A and 8B, distortions such as spherical aberration, comatic aberration, field curvature and distortion aberration are successfully corrected. Therefore, in the zoom lens of the embodiment 4, a low variation of the optical performance during vibration control and a high optical performance lens is acquired by properly setting the exit pupil distance and the refractive power of the image stabilizing unit Ls. Further, a small zoom lens effectively utilized the space by arranging the image stabilizing unit Ls, the aperture stop SP and the focal lens unit in order from the object side is acquired.

Figure 9:
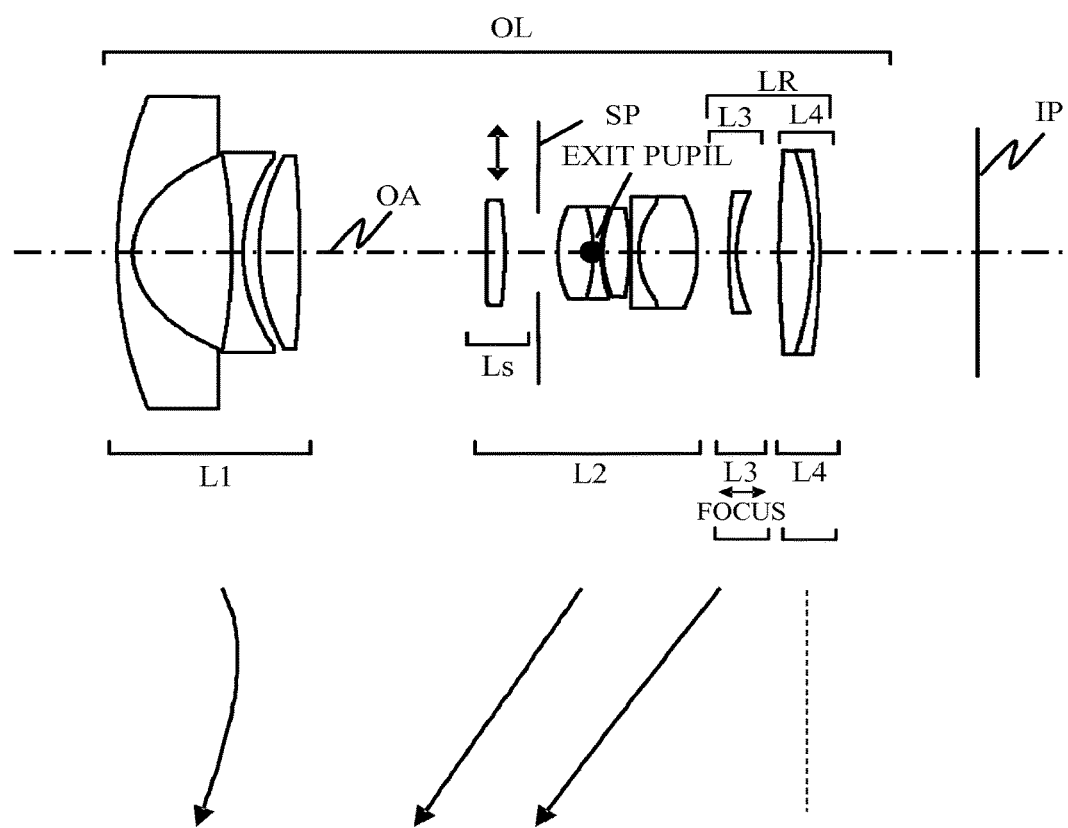
FIG. 9 is a sectional view at a wide angle end of a zoom lens according to an embodiment 5.

Hereafter, the zoom lens OL of the embodiment 5 of the present invention is described referring to FIG. 9. The focal length of the zoom lens of the embodiment 5 is from 11.0 mm to 22.0 mm. The zoom lens OL comprises a first lens unit L1 having a negative refractive power, a second lens unit L2 having a positive refractive power, a third lens unit L3 having a negative refractive power and a fourth lens unit L4 having a positive refractive power. The second lens unit L2 includes an image stabilizing unit Ls on the most object side and an aperture stop SP on the image side adjacent to the image stabilizing unit Ls. In addition, the third lens unit L3 arranged on the image side of the second lens unit L2 is a focus lens unit and moves along the optical axis during focusing.

The focal length of entire system at the wide angle end is 11.00 mm, the focal length of the image stabilizing unit LS is 61.62 mm and the distance $T_{Exp}$ between the exit pupil and the image surface as 38.03 mm. In this zoom lens, a value normalized the focal length of the image stabilizing unit Ls indicated in the condition (1) by the focal length of the entire system at the wide angle end is 5.60 and a value normalized the exit pupil distance indicated in condition (2) by the focal length of the entire system at the wide angle end is 3.46.

Figure 10A:
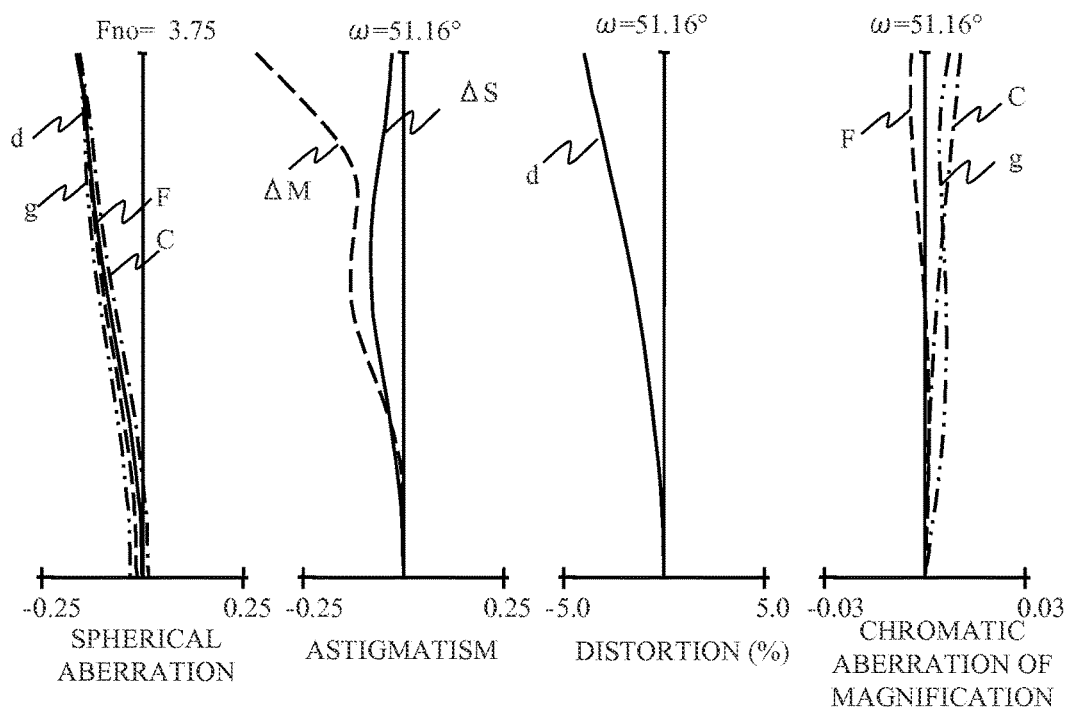
FIG. 10A and FIG. 10B are longitudinal aberration diagrams at a wide angle end and a telephoto end of the zoom lens according to the embodiment 5 when focusing at infinity.
Figure 10B:
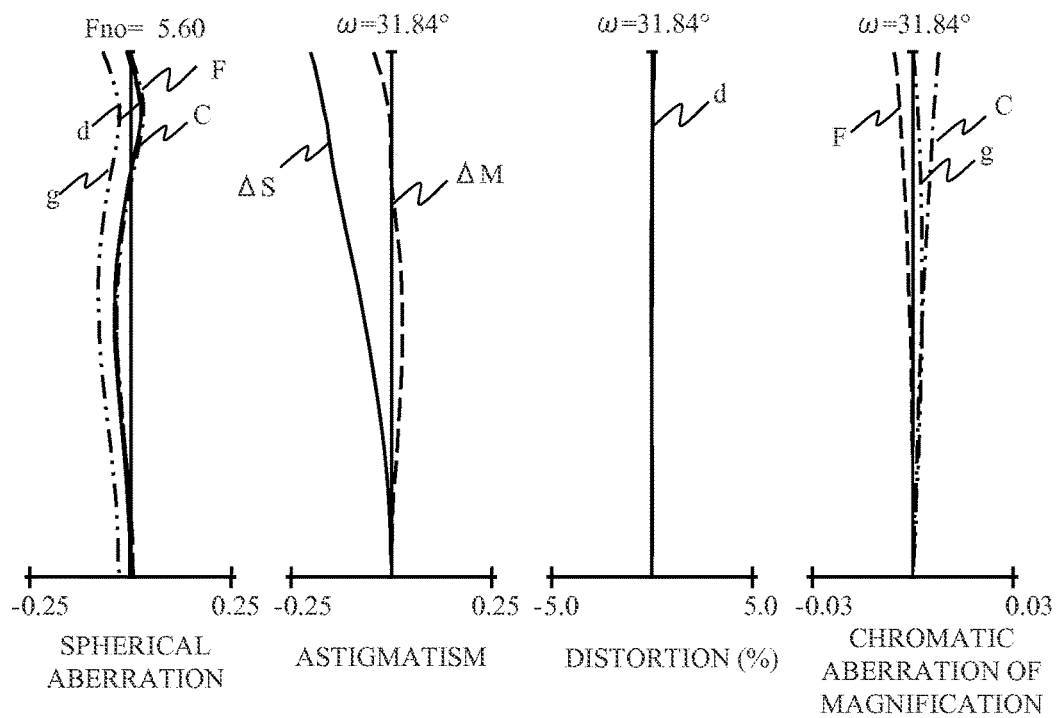

The zoom lens of the embodiment 5 makes the image pickup angle of view 2ω at the wide angle end 102.3° by the above power arrangement. Additionally, as illustrated in FIGS. 10A and 10B, distortions such as spherical aberration, comatic aberration, field curvature and distortion aberration are successfully corrected. Therefore, in the zoom lens of the embodiment 5, a low variation of the optical performance during vibration control and a high optical performance lens is acquired by properly setting the exit pupil distance and the refractive power of the image stabilizing unit Ls. Further, a small zoom lens effectively utilized the space by arranging the zoom lens Ls, the aperture stop SP and the focal lens unit in order from the object side is acquired.

Figure 11:
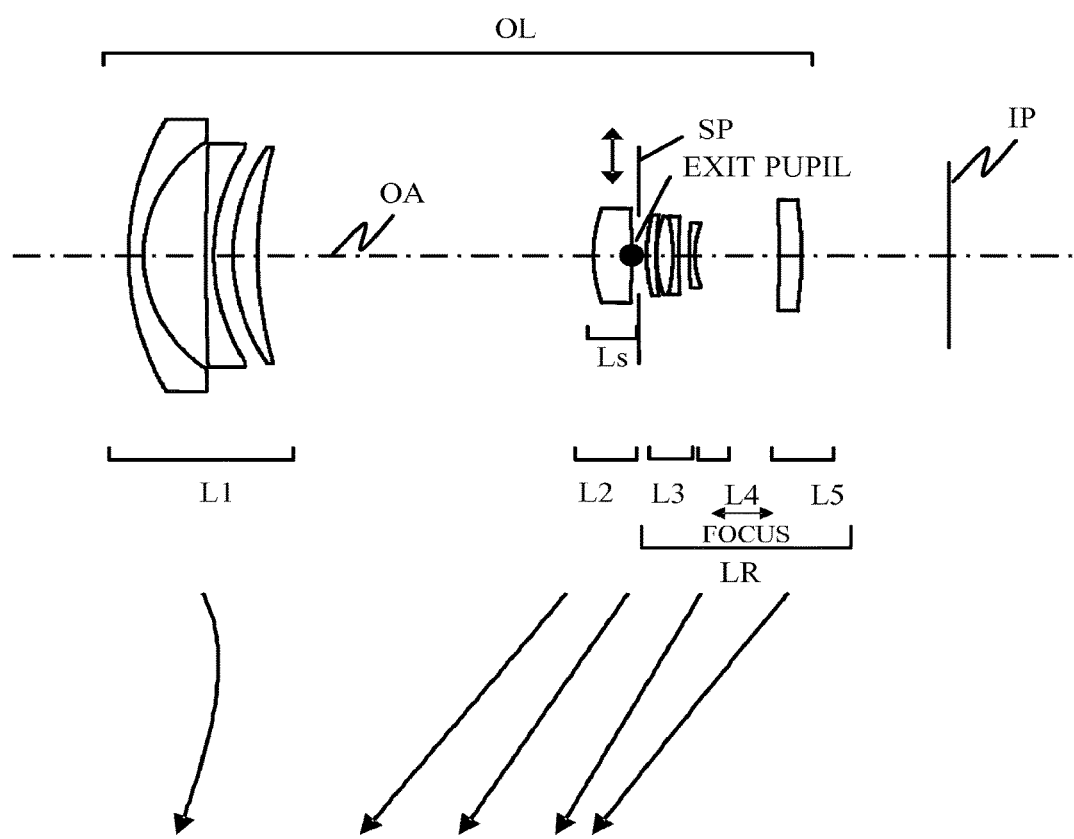
FIG. 11 is a sectional view at a wide angle end of a zoom lens according to an embodiment 6.

Hereafter, the zoom lens OL of the embodiment 6 of the present invention is described referring to FIG. 11. The focal length of the zoom lens of the embodiment 6 is from 18.2 mm to 44.0 mm. The zoom lens OL comprises a first lens unit L1 having a negative refractive power, a second lens unit L2 having a positive refractive power, a third lens unit L3 having a positive refractive power, a fourth lens unit L4 having a negative refractive power and a fifth lens unit L5 having a positive refractive power. The entire second lens unit L2 is an image stabilizing unit Ls on the most object side and an aperture stop SP is formed on the image side adjacent to the image stabilizing unit Ls. In addition, the fourth lens unit L4 arranged on the image side of the second lens unit L2 is a focus lens unit and moves along the optical axis during focusing.

The focal length of entire system at the wide angle end is 18.20 mm, the focal length of the image stabilizing unit Ls is 27.24 mm and the distance $T_{Exp}$ between the exit pupil and the image surface as 41.65 mm. In this zoom lens, a value normalized the focal length of the image stabilizing unit Ls indicated in the condition (1) by the focal length of the entire system at the wide angle end is 1.50 and a value normalized the exit pupil distance indicated in condition (2) by the focal length of the entire system at the wide angle end is 2.29.

Figure 12A:
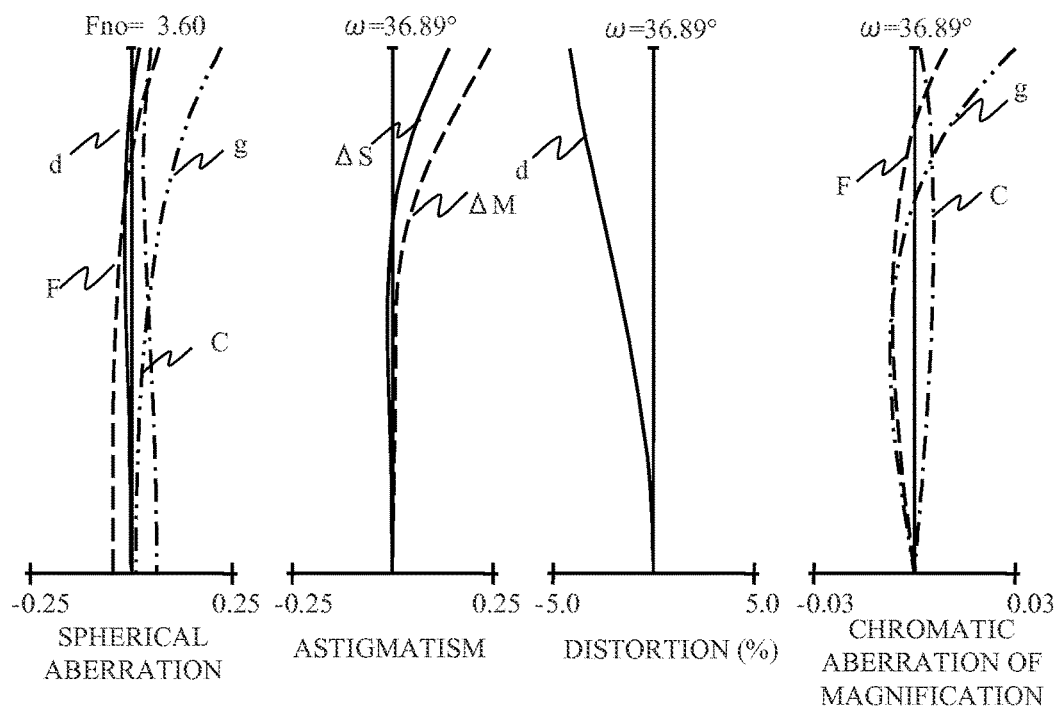
FIG. 12A and FIG. 12B are longitudinal aberration diagrams at a wide angle end and a telephoto end of the zoom lens according to the embodiment 6 when focusing at infinity.
Figure 12B:
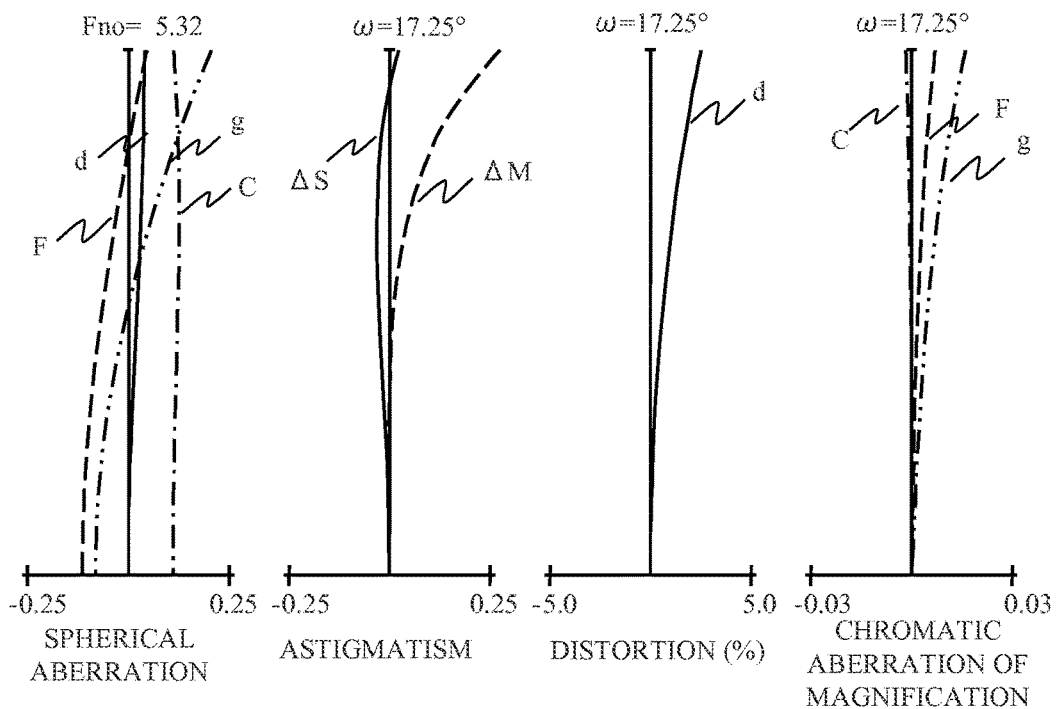

The zoom lens of the embodiment 6 makes the image pickup angle of view 2ω at the wide angle end 73.8° by the above power arrangement. Additionally, as illustrated in FIGS. 12A and 12B, distortions such as spherical aberration, comatic aberration, field curvature and distortion aberration are successfully corrected. Therefore, in the zoom lens of the embodiment 6, a low variation of the optical performance during vibration control and a high optical performance lens is acquired by properly setting the exit pupil distance and the refractive power of the image stabilizing unit Ls. Further, a small zoom lens effectively utilized the space by arranging the zoom lens Ls, the aperture stop SP and the focal lens unit in order from the object side is acquired.

Figure 13:
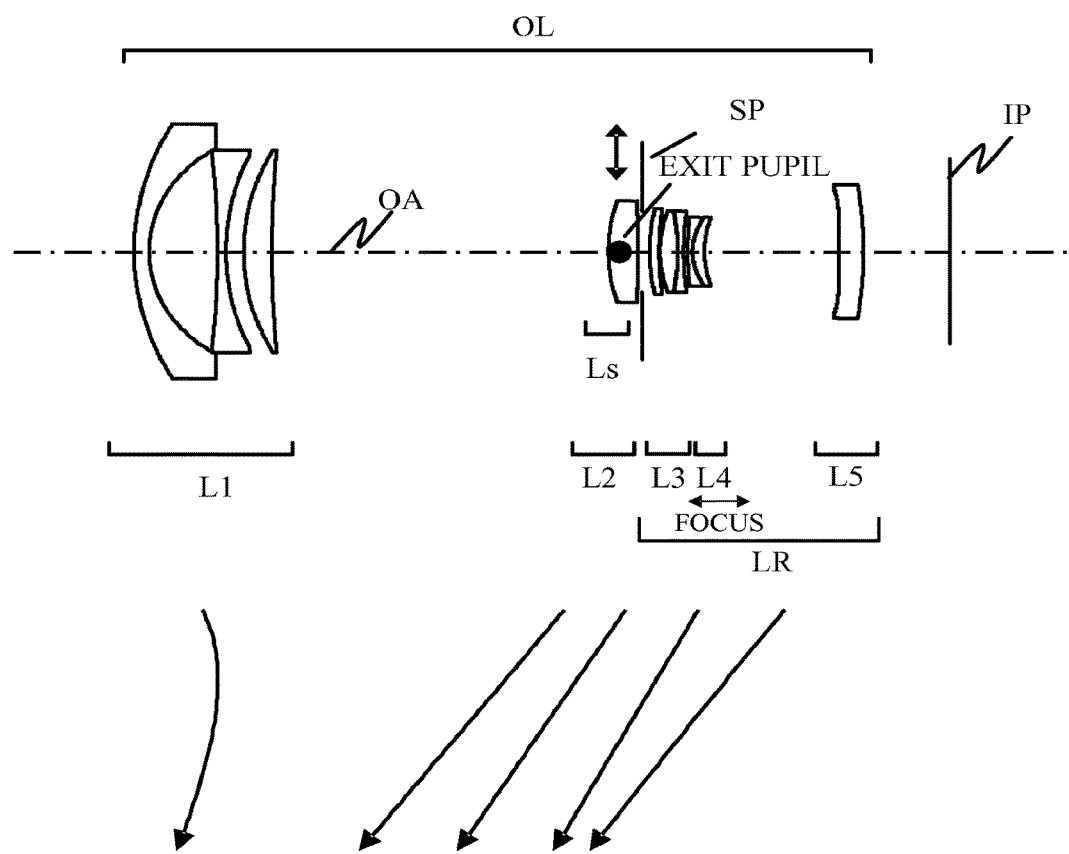
FIG. 13 is a sectional view at a wide angle end of a zoom lens according to an embodiment 7.

Hereafter, the zoom lens OL of the embodiment 7 of the present invention is described referring to FIG. 13. The focal length of the zoom lens of the embodiment 7 is from 15.5 mm to 52.9 mm. The zoom lens OL comprises a first lens unit L1 having a negative refractive power, a second lens unit L2 having a positive refractive power, a third lens unit L3 having a positive refractive power, a fourth lens unit L4 having a negative refractive power and a fifth lens unit L5 having a positive refractive power. The entire second lens unit L2 is an image stabilizing unit Ls on the most object side and an aperture stop SP is formed on the image side adjacent to the image stabilizing unit Ls. In addition, the fourth lens unit L4 arranged on the image side of the second lens unit L2 is a focus lens unit and moves along the optical axis during focusing.

The focal length of entire system at the wide angle end is 15.50 mm, the focal length of the image stabilizing unit Ls is 27.93 mm and the distance $T_{Exp}$ between the exit pupil and the image surface as 43.31 mm. In this zoom lens, a value normalized the focal length of the image stabilizing unit Ls indicated in the condition (1) by the focal length of the entire system at the wide angle end is 1.80 and a value normalized the exit pupil distance indicated in condition (2) by the focal length of the entire system at the wide angle end is 2.79.

The zoom lens of the embodiment 7 makes the image pickup angle of view 2ω at the wide angle end 82.8° by the above power arrangement. Additionally, as illustrated in FIGS. 14A and 14B, distortions such as spherical aberration, comatic aberration, field curvature and distortion aberration are successfully corrected. Therefore, in the zoom lens of the embodiment 7, a low variation of the optical performance during vibration control and a high optical performance lens is acquired by properly setting the exit pupil distance and the refractive power of the image stabilizing unit Ls. Further, a small zoom lens effectively utilized the space by arranging the image stabilizing unit Ls, the aperture stop SP and the focal lens unit in order from the object side is acquired.

FIG. 15 is a schematic diagram of a main part of an image pickup apparatus of the present invention. In FIG. 15, reference 10 denotes an image pickup apparatus including any one zoom lens of embodiments 1 to 7. An image pickup optical system 1 is hold by a lens barrel which is a holding member. Reference 20 denotes a camera body. The camera body 20 comprises a quick return mirror 3, a focusing screen 4, a penta dach prism 5 and an ocular lens 6.

The quick return mirror 3 reflects a light flux from the image pickup optical system 10 upward. The focusing screen 4 is arranged at an image forming position of the image pickup optical system 10. The penta dach prism 5 converts a reverse image formed on the focusing screen 4 into an erected image. An observer observes the erected image by the ocular lens 6. Reference 7 denotes a light sensitive surface and a solid image pickup element (a photoelectric conversion element) such as a CCD sensor and a CMOS sensor receiving an image and a silver-halide film are arranged on the light sensitive surface 7. The quick return mirror 3 is evacuated from a light path when taking an image and the image pickup optical system 10 forms an image on the light sensitive surface 7.

The present invention achieves an image-pickup apparatus having high optical performance by applying a zoom lens to a single lens reflex camera. The zoom lens of the present invention is capable of applying to an image pickup apparatus having a mirror lens. Additionally, the zoom lens of the present invention is capable of applying to an optical apparatus such as a telescope, a binocular, a copier and a projector besides a digital camera, a video camera and a silver-halide camera.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

Hereinafter, concrete numerical examples 1 to 7 corresponding to the zoom lens of the embodiments 1 to 7 are illustrated. i represents an optical surface number counted from the object side. A surface number is counted form the object side. Ri represents a curvature radius (mm) of an i-th lens surface, Di represents a surface interval (mm) between the i-th lens surface and the i+1-th lens surface. Ndi and νdi respectively represent a refractive index and an Abbe number of a material between the i-th lens surface and the i+1-th lens surface relative to the d-line. Additionally, BF represents a back focus. The entire zoom lens length represents a distance from the first lens surface to the image surface.

Additionally, an aspheric surface is indicated by adding * after a surface number. An aspheric shape is expressed by the following expression where X represents a displacement from a surface top in the optical axis direction, h represents a height in a direction perpendicular to the optical axis from the optical axis, r represents a paraxial curvature radius, K represents a conical constant and B, C, D, E . . . represent aspheric coefficients of each degree:

$$X(h) = \frac{(1/r)h^2}{1+\sqrt{\{1-(1+K)(h/r)^2\}}} + Bh^4 + Ch^6 + Dh^8 + Eh^{10}\ldots \quad \text{[Number 1]}$$

"E±XX" of each aspheric coefficient represents "×10±$^{XX}$". Moreover, Table 1 indicates various numerical values of parameters related to the above-described conditions. Table 2 indicates various numerical values corresponding to the above-described conditions.

Numerical Example 1

| Surface number | R | D | Nd | νd | Light effective diameter |
|---|---|---|---|---|---|
| unit mm | | | | | |
| 1 | 30.452 | 2.30 | 1.77250 | 49.6 | 30.34 |
| 2* | 8.896 | 8.59 | | | 20.18 |

-continued unit mm

| | | | | | |
|---|---|---|---|---|---|
| 3 | −64.867 | 1.20 | 1.77250 | 49.6 | 19.74 |
| 4 | 19.876 | 2.78 | | | 18.43 |
| 5 | 25.154 | 3.91 | 1.73800 | 32.3 | 19.02 |
| 6 | −83.477 | (variable) | | | 18.71 |
| 7 | −94.280 | 1.21 | 1.83400 | 37.2 | 9.22 |
| 8 | −36.820 | 3.50 | | | 9.36 |
| 9(diaphragm) | ∞ | 2.00 | | | 9.64 |
| 10 | 12.993 | 4.68 | 1.51823 | 58.9 | 9.98 |
| 11 | −10.954 | 0.80 | 1.83400 | 37.2 | 9.43 |
| 12 | 19.514 | 0.40 | | | 9.43 |
| 13 | 13.843 | 4.02 | 1.48749 | 70.2 | 9.74 |
| 14 | −13.973 | 0.15 | | | 10.33 |
| 15 | −63.398 | 3.49 | 1.76182 | 26.5 | 10.49 |
| 16 | −8.985 | 0.80 | 1.83400 | 37.2 | 10.80 |
| 17 | −25.030 | 0.15 | | | 11.23 |
| 18 | 30.854 | 5.63 | 1.49700 | 81.5 | 11.24 |
| 19 | −8.100 | 0.80 | 1.88300 | 40.8 | 10.90 |
| 20 | −43.415 | (variable) | | | 11.59 |
| 21 | 62.117 | 0.80 | 1.83400 | 37.2 | 12.13 |
| 22 | 16.329 | (variable) | | | 12.23 |
| 23 | 50.797 | 2.55 | 1.48749 | 70.2 | 19.34 |
| 24 | −419.766 | (variable) | | | 20.01 |
| Image surface | ∞ | | | | |

Aspheric data

| | Conical constant K | 4th coefficient B | 6th coefficient C |
|---|---|---|---|
| 2nd surface | −4.7384E−01 | 7.3430E−06 | −1.2623E−07 |

| | 8th coefficient D | 10th coefficient E |
|---|---|---|
| 2nd surface | 1.8138E−09 | −9.1816E−12 |

Various data

| | Wide angle end | Intermediate | Telephoto end |
|---|---|---|---|
| Focal length | 11.00 | 15.50 | 22.00 |
| Fno | 4.00 | 4.60 | 5.60 |
| ω | 51.16 | 41.39 | 31.84 |
| Image height | 13.66 | 13.66 | 13.66 |
| Lens overall length | 90.36 | 85.76 | 87.31 |
| BF | 11.06 | 16.81 | 25.49 |
| Entrance pupil position | 12.53 | 11.56 | 10.61 |
| Exit pupil position | −25.36 | −24.91 | −24.74 |
| Front side principle point position | 20.21 | 21.30 | 22.97 |
| Rear side principle point position | 0.06 | 1.31 | 3.49 |

Variable interval

| Surface number | Wide angle end | Intermediate | Telephoto end |
|---|---|---|---|
| 6 | 20.48 | 10.13 | 3.00 |
| 20 | 1.30 | 1.73 | 1.90 |
| 22 | 7.77 | 7.34 | 7.17 |
| 24 | 11.06 | 16.81 | 25.49 |

Unit data

| Unit | Starting surface | Focal length | Lens structure length |
|---|---|---|---|
| 1 | 1 | −16.33 | 18.77 |
| 2 | 7 | 18.63 | 27.64 |
| 3 | 21 | −26.77 | 0.80 |
| 4 | 23 | 93.12 | 2.55 |

-continued unit mm

| Unit | Front side principle point position | Rear side principle point position |
|---|---|---|
| 1 | 0.75 | −17.57 |
| 2 | 8.13 | −12.46 |
| 3 | 0.60 | 0.16 |
| 4 | 0.19 | −1.53 |

Single lens data

| Lens | Starting surface | Focal length |
|---|---|---|
| 1 | 1 | −17.060 |
| 2 | 3 | −19.570 |
| 3 | 5 | 26.600 |
| 4 | 7 | 71.750 |
| 5 | 10 | 12.290 |
| 6 | 11 | −8.310 |
| 7 | 13 | 14.970 |
| 8 | 15 | 13.370 |
| 9 | 16 | −17.200 |
| 10 | 18 | 13.560 |
| 11 | 19 | −11.400 |
| 12 | 21 | −26.770 |
| 13 | 23 | 93.120 |

Numerical Example 2 unit mm

| Surface number | R | D | Nd | vd | Light effective diameter |
|---|---|---|---|---|---|
| 1 | 24.756 | 1.50 | 1.88300 | 40.8 | 31.54 |
| 2 | 13.493 | 3.34 | | | 24.41 |
| 3 | 15.534 | 1.80 | 1.58313 | 59.4 | 23.50 |
| 4* | 7.468 | 9.77 | | | 18.53 |
| 5 | −31.870 | 1.20 | 1.58913 | 61.1 | 17.96 |
| 6 | 33.804 | 0.15 | | | 17.75 |
| 7 | 23.445 | 3.93 | 1.73800 | 32.3 | 17.93 |
| 8 | −102.949 | (variable) | | | 17.55 |
| 9 | −88.715 | 1.43 | 1.77250 | 49.6 | 9.53 |
| 10 | −34.817 | 3.57 | | | 9.77 |
| 11(diaphragm) | ∞ | 1.91 | | | 10.26 |
| 12 | 16.496 | 4.12 | 1.59551 | 39.2 | 10.62 |
| 13 | −12.959 | 0.80 | 1.83400 | 37.2 | 10.24 |
| 14 | 24.029 | 1.59 | | | 10.15 |
| 15 | 14.291 | 4.62 | 1.49700 | 81.5 | 10.90 |
| 16 | −24.473 | 0.15 | | | 11.57 |
| 17 | 35.328 | 0.80 | 1.88300 | 40.8 | 11.73 |
| 18 | 10.947 | 3.83 | 1.56384 | 60.7 | 11.54 |
| 19 | −48.946 | 0.13 | | | 11.79 |
| 20 | 63.696 | 5.40 | 1.60342 | 38.0 | 11.85 |
| 21 | −8.216 | 0.80 | 1.88300 | 40.8 | 11.80 |
| 22 | −46.523 | (variable) | | | 12.58 |
| 23 | 29.911 | 0.70 | 1.91082 | 35.3 | 13.30 |
| 24 | 16.324 | (variable) | | | 13.19 |
| 25 | 62.139 | 2.85 | 1.58313 | 59.4 | 19.88 |
| 26* | 93.393 | (variable) | | | 20.70 |
| Image surface | ∞ | | | | |

Aspheric data

| | Conical constant K | 4th coefficient B | 6th coefficient C |
|---|---|---|---|
| 4th Surface | −9.5172E−01 | 1.2862E−04 | 2.0642E−07 |
| 26th Surface | 0.0000E+00 | −2.3175E−06 | −8.8498E−08 |

-continued unit mm

| | 8th coefficient D | 10th coefficient E |
|---|---|---|
| 4th Surface | 7.9480E−09 | −3.1156E−11 |
| 26th Surface | 6.6362E−10 | −2.5916E−12 |

Various data

| | Wide angle end | Intermediate | Telephoto end |
|---|---|---|---|
| Focal length | 12.03 | 17.00 | 23.66 |
| Fno | 4.00 | 4.69 | 5.60 |
| ω | 48.63 | 38.78 | 30.00 |
| Image height | 13.66 | 13.66 | 13.66 |
| Lens overall length | 94.79 | 92.90 | 95.73 |
| BF | 10.99 | 17.95 | 26.98 |
| Entrance pupil position | 14.68 | 13.78 | 12.92 |
| Exit pupil position | −25.93 | −25.96 | −25.83 |
| Front side principle point position | 22.79 | 24.20 | 25.98 |
| Rear side principle point position | −1.04 | 0.95 | 3.32 |

Variable interval

| Surface number | Wide angle end | Intermediate | Telephoto end |
|---|---|---|---|
| 8 | 18.54 | 9.70 | 3.50 |
| 22 | 1.49 | 1.44 | 1.64 |
| 24 | 9.38 | 9.43 | 9.22 |
| 26 | 10.99 | 17.95 | 26.98 |

Unit data

| Unit | Starting surface | Focal length | Lens structure length |
|---|---|---|---|
| 1 | 1 | −16.22 | 21.68 |
| 2 | 9 | 20.05 | 29.16 |
| 3 | 23 | −40.45 | 0.70 |
| 4 | 25 | 308.10 | 2.85 |

| Unit | Front side principle point position | Rear side principle point position |
|---|---|---|
| 1 | 3.19 | −16.28 |
| 2 | 8.92 | −13.33 |
| 3 | 0.83 | 0.45 |
| 4 | −3.46 | −5.20 |

Single lens data

| Lens | Starting surface | Focal length |
|---|---|---|
| 1 | 1 | −35.820 |
| 2 | 3 | −26.870 |
| 3 | 5 | −27.660 |
| 4 | 7 | 26.220 |
| 5 | 9 | 73.340 |
| 6 | 12 | 12.860 |
| 7 | 13 | −10.000 |
| 8 | 15 | 18.900 |
| 9 | 17 | −18.250 |
| 10 | 18 | 16.240 |
| 11 | 20 | 12.410 |
| 12 | 21 | −11.410 |
| 13 | 23 | −40.450 |
| 14 | 25 | 308.100 |

Numerical Example 3 unit mm

| Surface number | R | D | Nd | νd | Light effective diameter |
|---|---|---|---|---|---|
| 1* | 50.214 | 2.30 | 1.58313 | 59.4 | 32.10 |
| 2* | 8.890 | 9.13 | | | 20.52 |
| 3 | −43.823 | 1.20 | 1.77250 | 49.6 | 19.85 |
| 4 | 16.692 | 2.56 | | | 18.10 |
| 5 | 24.841 | 3.70 | 1.91082 | 35.3 | 18.76 |
| 6 | −110.630 | (variable) | | | 18.47 |
| 7 | −130.232 | 1.28 | 1.69680 | 55.5 | 9.09 |
| 8 | −36.876 | 3.50 | | | 9.23 |
| 9(diaphragm) | ∞ | 2.00 | | | 9.62 |
| 10 | 11.211 | 4.49 | 1.51742 | 52.4 | 10.00 |
| 11 | −14.765 | 0.80 | 1.88300 | 40.8 | 9.35 |
| 12 | 14.950 | 0.40 | | | 9.19 |
| 13 | 11.819 | 4.14 | 1.53172 | 48.8 | 9.50 |
| 14 | −17.101 | 0.67 | | | 10.23 |
| 15 | 31.522 | 6.71 | 1.49700 | 81.5 | 10.51 |
| 16 | −7.227 | 0.67 | 1.85400 | 40.4 | 10.44 |
| 17* | −26.546 | (variable) | | | 11.29 |
| 18 | 43.166 | 0.80 | 1.83400 | 37.2 | 12.11 |
| 19 | 18.139 | (variable) | | | 12.20 |
| 20 | 62.546 | 6.85 | 1.62588 | 35.7 | 16.56 |
| 21 | −12.150 | 1.00 | 1.83481 | 42.7 | 17.50 |
| 22 | −50.363 | (variable) | | | 19.50 |
| Image surface | ∞ | | | | |

Aspheric data

| | Conical constant K | 4th coefficient B | 6th coefficient C |
|---|---|---|---|
| 1st Surface | 0.0000E+00 | 2.2514E−05 | −6.3808E−08 |
| 2nd Surface | −4.7832E−01 | 9.5239E−06 | −6.2835E−08 |
| 17th Surface | 0.0000E+00 | 2.6963E−05 | 3.6258E−07 |

| | 8th coefficient D | 10th coefficient E |
|---|---|---|
| 1st Surface | 4.2156E−11 | 1.4451E−13 |
| 2nd Surface | 2.4304E−09 | −4.1669E−11 |
| 17th Surface | −5.2493E−09 | 1.9541E−10 |

Various data

| | Wide angle end | Intermediate | Telephoto end |
|---|---|---|---|
| Focal length | 11.00 | 15.50 | 22.00 |
| Fno | 4.00 | 4.63 | 5.60 |
| ω | 51.16 | 41.39 | 31.84 |
| Image height | 13.66 | 13.66 | 13.66 |
| Lens overall length | 89.99 | 86.41 | 88.30 |
| BF | 11.04 | 17.16 | 26.00 |
| Entrance pupil position | 12.79 | 11.87 | 10.93 |
| Exit pupil position | −25.50 | −25.33 | −25.17 |
| Front side principle point position | 20.48 | 21.71 | 23.47 |
| Rear side principle point position | 0.04 | 1.66 | 4.00 |

Variable interval

| Surface number | Wide angle end | Intermediate | Telephoto end |
|---|---|---|---|
| 6 | 19.65 | 9.95 | 3.00 |
| 17 | 1.30 | 1.53 | 1.75 |
| 19 | 5.78 | 5.55 | 5.33 |
| 22 | 11.04 | 17.16 | 26.00 |

-continued unit mm

Unit data

| Unit | Starting surface | Focal length | Lens structure length |
|---|---|---|---|
| 1 | 1 | −16.02 | 18.89 |
| 2 | 7 | 19.48 | 24.67 |
| 3 | 18 | −38.07 | 0.80 |
| 4 | 20 | 105.57 | 7.85 |

| Unit | Front side principle point position | Rear side principle point position |
|---|---|---|
| 1 | 1.27 | −16.90 |
| 2 | 6.45 | −12.34 |
| 3 | 0.76 | 0.32 |
| 4 | 0.75 | −4.08 |

Single lens data

| Lens | Starting surface | Focal length |
|---|---|---|
| 1 | 1 | −18.910 |
| 2 | 3 | −15.510 |
| 3 | 5 | 22.570 |
| 4 | 7 | 73.410 |
| 5 | 10 | 13.090 |
| 6 | 11 | −8.310 |
| 7 | 13 | 13.830 |
| 8 | 15 | 12.550 |
| 9 | 16 | −11.820 |
| 10 | 18 | −38.070 |
| 11 | 20 | 16.850 |
| 12 | 21 | −19.410 |

Numerical Example 4 unit mm

| Surface number | R | D | Nd | vd | Light effective diameter |
|---|---|---|---|---|---|
| 1 | 34.122 | 1.60 | 1.58313 | 59.4 | 31.19 |
| 2* | 8.028 | 9.42 | | | 19.95 |
| 3 | −71.877 | 1.20 | 1.77250 | 49.6 | 19.48 |
| 4 | 17.965 | 2.39 | | | 17.94 |
| 5 | 22.361 | 3.69 | 1.80000 | 29.8 | 18.39 |
| 6 | −196.840 | (variable) | | | 17.99 |
| 7 | −118.088 | 1.92 | 1.48749 | 70.2 | 10.90 |
| 8 | −27.338 | 3.50 | | | 10.81 |
| 9(diaphragm) | ∞ | 2.00 | | | 9.54 |
| 10 | 13.335 | 7.54 | 1.48749 | 70.2 | 10.78 |
| 11 | −15.343 | 0.80 | 1.83400 | 37.2 | 9.63 |
| 12 | 26.144 | 0.15 | | | 9.56 |
| 13 | 11.701 | 3.99 | 1.49700 | 81.5 | 10.36 |
| 14 | −17.985 | 0.15 | | | 10.79 |
| 15 | −84.127 | 5.08 | 1.74077 | 27.8 | 10.81 |
| 16 | −8.398 | 0.80 | 1.85400 | 40.4 | 11.02 |
| 17* | −59.178 | (variable) | | | 11.47 |
| 18 | 146.634 | 0.80 | 1.83400 | 37.2 | 13.30 |
| 19 | 23.749 | (variable) | | | 13.66 |
| 20 | 24.648 | 5.30 | 1.48749 | 70.2 | 18.30 |
| 21 | −29.395 | 0.80 | 1.83400 | 37.2 | 18.93 |
| 22 | −199.614 | (variable) | | | 19.75 |
| Image surface | ∞ | | | | |

-continued unit mm

Aspheric data

| | Conical constant K | 4th coefficient B | 6th coefficient C |
|---|---|---|---|
| 2nd Surface | −5.4449E−01 | 6.5936E−06 | 1.3705E−08 |
| 17th Surface | 0.0000E+00 | 1.5302E−04 | 1.3290E−06 |

| | 8th coefficient D | 10th coefficient E |
|---|---|---|
| 2nd Surface | 8.5783E−11 | 9.8148E−12 |
| 17th Surface | 4.4175E−09 | 2.4817E−10 |

Various data

| | Wide angle end | Intermediate | Telephoto end |
|---|---|---|---|
| Focal length | 11.00 | 15.50 | 22.00 |
| Fno | 3.78 | 4.49 | 5.60 |
| ω | 51.16 | 41.39 | 31.84 |
| Image height | 13.66 | 13.66 | 13.66 |
| Lens overall length | 87.38 | 85.14 | 90.28 |
| BF | 11.27 | 17.83 | 28.86 |
| Entrance pupil position | 12.41 | 11.51 | 10.69 |
| Exit pupil position | −23.42 | −24.00 | −25.56 |
| Front side principle point position | 19.93 | 21.27 | 23.80 |
| Rear side principle point position | 0.27 | 2.33 | 6.86 |

Variable interval

| Surface number | Wide angle end | Intermediate | Telephoto end |
|---|---|---|---|
| 6 | 17.69 | 8.89 | 3.00 |
| 17 | 3.66 | 3.02 | 1.30 |
| 19 | 3.62 | 4.26 | 5.98 |
| 22 | 11.27 | 17.83 | 28.86 |

Unit data

| Unit | Starting surface | Focal length | Lens structure length |
|---|---|---|---|
| 1 | 1 | −16.23 | 18.30 |
| 2 | 7 | 19.93 | 25.93 |
| 3 | 18 | −34.08 | 0.80 |
| 4 | 20 | 78.81 | 6.10 |

| Unit | Front side principle point position | Rear side principle point position |
|---|---|---|
| 1 | 0.95 | −16.42 |
| 2 | 8.43 | −12.09 |
| 3 | 0.52 | 0.08 |
| 4 | −1.99 | −5.86 |

Single lens data

| Lens | Starting surface | Focal length |
|---|---|---|
| 1 | 1 | −18.420 |
| 2 | 3 | −18.500 |
| 3 | 5 | 25.290 |
| 4 | 7 | 72.470 |
| 5 | 10 | 16.010 |
| 6 | 11 | −11.490 |
| 7 | 13 | 14.930 |
| 8 | 15 | 12.240 |
| 9 | 16 | −11.540 |
| 10 | 18 | −34.080 |
| 11 | 20 | 28.420 |
| 12 | 21 | −41.420 |

Numerical Example 5 unit mm

| Surface number | R | D | Nd | vd | Light effective diameter |
|---|---|---|---|---|---|
| 1 | 49.850 | 1.60 | 1.58313 | 59.4 | 33.47 |
| 2* | 8.285 | 10.06 | | | 21.35 |
| 3 | −60.286 | 1.20 | 1.72916 | 54.7 | 20.95 |
| 4 | 19.148 | 1.61 | | | 19.63 |
| 5 | 23.684 | 4.13 | 1.91082 | 35.3 | 20.11 |
| 6 | −122.962 | (variable) | | | 19.75 |
| 7 | 273.075 | 1.79 | 1.80400 | 46.6 | 10.68 |
| 8 | −60.345 | 3.50 | | | 10.39 |
| 9(diaphragm) | ∞ | 2.00 | | | 9.01 |
| 10 | 13.521 | 3.59 | 1.49700 | 81.5 | 9.48 |
| 11 | −16.809 | 0.80 | 1.88300 | 40.8 | 9.05 |
| 12 | 16.281 | 0.15 | | | 8.95 |
| 13 | 13.245 | 2.70 | 1.58313 | 59.4 | 9.10 |
| 14* | −22.565 | 0.15 | | | 9.17 |
| 15 | 438.452 | 0.80 | 1.88300 | 40.8 | 9.44 |
| 16 | 8.948 | 5.97 | 1.66998 | 39.3 | 9.95 |
| 17 | −14.546 | (variable) | | | 11.46 |
| 18 | 57.281 | 0.80 | 1.83400 | 37.2 | 12.43 |
| 19 | 17.781 | (variable) | | | 12.45 |
| 20 | 149.796 | 3.32 | 1.48749 | 70.2 | 20.59 |
| 21 | −38.337 | 0.80 | 1.80000 | 29.8 | 20.97 |
| 22 | −87.392 | | | | 21.47 |
| Image surface | ∞ | | | | |

Aspheric data

| | Conical constant K | 4th coefficient B | 6th coefficient C |
|---|---|---|---|
| 2nd Surface | −8.0765E−01 | 4.7393E−05 | 1.2777E−07 |
| 14th Surface | 0.0000E+00 | 1.2892E−04 | 1.0224E−07 |

| | 8th coefficient D | 10th coefficient E |
|---|---|---|
| 2nd Surface | 9.2378E−10 | 8.0140E−12 |
| 14th Surface | −9.3803E−09 | −9.8935E−12 |

Various data

| | Wide angle end | Intermediate | Telephoto end |
|---|---|---|---|
| Focal length | 11.00 | 15.50 | 22.00 |
| Fno | 3.75 | 4.51 | 5.60 |
| ω | 51.16 | 41.39 | 31.84 |
| Image height | 13.66 | 13.66 | 13.66 |
| Lens overall length | 87.43 | 85.83 | 90.30 |
| BF | 16.00 | 16.00 | 16.00 |
| Entrance pupil position | 12.56 | 11.54 | 10.52 |
| Exit pupil position | −22.03 | −32.20 | −48.28 |
| Front side principle point position | 20.38 | 22.05 | 24.99 |
| Rear side principle point position | 5.00 | 0.50 | −6.00 |

Variable interval

| Surface number | Wide angle end | Intermediate | Telephoto end |
|---|---|---|---|
| 6 | 18.95 | 9.75 | 3.00 |
| 17 | 3.18 | 2.23 | 1.30 |
| 19 | 4.32 | 12.88 | 25.02 | unit mm

Unit data

| Unit | Starting surface | Focal length | Lens structure length |
|---|---|---|---|
| 1 | 1 | −18.91 | 18.61 |
| 2 | 7 | 18.02 | 21.45 |
| 3 | 18 | −31.21 | 0.80 |
| 4 | 20 | 234.23 | 4.12 |

| Unit | Front side principle point position | Rear side principle point position |
|---|---|---|
| 1 | −0.52 | −18.78 |
| 2 | 12.31 | −6.95 |
| 3 | 0.64 | 0.20 |
| 4 | 1.49 | −1.20 |

Single lens data

| Lens | Starting surface | Focal length |
|---|---|---|
| 1 | 1 | −17.280 |
| 2 | 3 | −19.800 |
| 3 | 5 | 22.100 |
| 4 | 7 | 61.620 |
| 5 | 10 | 15.690 |
| 6 | 11 | −9.260 |
| 7 | 13 | 14.720 |
| 8 | 15 | −10.350 |
| 9 | 16 | 9.210 |
| 10 | 18 | −31.210 |
| 11 | 20 | 62.980 |
| 12 | 21 | −86.000 |

Numerical Example 6 unit mm

| Surface number | R | D | Nd | vd | Light effective diameter |
|---|---|---|---|---|---|
| 1 | 42.192 | 2.00 | 1.83481 | 42.7 | 38.67 |
| 2 | 20.779 | 8.32 | | | 32.20 |
| 3 | 392.860 | 1.10 | 1.77250 | 49.6 | 31.58 |
| 4 | 31.282 | 2.59 | | | 29.87 |
| 5 | 29.503 | 3.38 | 1.84666 | 23.8 | 30.35 |
| 6 | 62.162 | (variable) | | | 29.90 |
| 7 | 21.910 | 5.14 | 1.69680 | 55.5 | 12.85 |
| 8 | −128.457 | (variable) | | | 12.09 |
| 9(diaphragm) | ∞ | 1.00 | | | 11.68 |
| 10 | 26.166 | 1.23 | 1.72916 | 54.7 | 11.11 |
| 11 | 39.285 | 0.12 | | | 10.72 |
| 12 | 19.423 | 2.11 | 1.51633 | 64.1 | 10.49 |
| 13 | −31.921 | 0.80 | 1.84666 | 23.8 | 9.99 |
| 14 | 66.357 | (variable) | | | 9.51 |
| 15 | 143.428 | 0.70 | 1.51633 | 64.1 | 8.78 |
| 16 | 13.723 | (variable) | | | 8.31 |
| 17 | −186.017 | 3.00 | 1.69895 | 30.1 | 13.98 |
| 18* | −49.357 | (variable) | | | 15.11 |
| Image surface | ∞ | | | | 0.00 |

Aspheric data

| | Conical constant K | 4th coefficient B | 6th coefficient C |
|---|---|---|---|
| 18th Surface | 0.0000E+00 | 3.4776E−05 | −2.9562E−09 |

-continued unit mm

| | 8th coefficient D | 10th coefficient E | 12th coefficient F |
|---|---|---|---|
| 18th Surface | 2.6360E-09 | -2.9532E-11 | 1.1023E-13 |

Various data

| | Wide angle end | Intermediate | Telephoto end |
|---|---|---|---|
| Focal length | 18.20 | 24.00 | 44.00 |
| Fno | 3.60 | 3.96 | 5.32 |
| ω | 36.89 | 29.65 | 17.25 |
| Image height | 13.66 | 13.66 | 13.66 |
| Lens overall length | 110.00 | 95.81 | 82.91 |
| BF | 19.77 | 24.93 | 38.25 |
| Entrance pupil position | 26.66 | 23.65 | 16.85 |
| Exit pupil position | -21.88 | -18.22 | -12.86 |
| Front side principle point position | 36.91 | 34.30 | 22.96 |
| Rear side principle point position | 1.57 | 0.93 | -5.75 |

Variable interval

| Surface number | Wide angle end | Intermediate | Telephoto end |
|---|---|---|---|
| 6 | 44.97 | 27.86 | 4.75 |
| 8 | 1.00 | 1.07 | 1.32 |
| 14 | 1.50 | 2.04 | 3.71 |
| 16 | 11.26 | 8.41 | 3.39 |
| 18 | 19.77 | 24.93 | 38.25 |

Unit data

| Unit | Starting surface | Focal length | Lens structure length |
|---|---|---|---|
| 1 | 1 | -37.32 | 17.39 |
| 2 | 7 | 27.24 | 5.14 |
| 3 | 9 | 69.58 | 5.26 |
| 4 | 15 | -29.44 | 0.70 |
| 5 | 17 | 95.26 | 3.00 |

| Unit | Front side principle point position | Rear side principle point position |
|---|---|---|
| 1 | 3.61 | -10.72 |
| 2 | 0.45 | -2.62 |
| 3 | -2.33 | -5.71 |
| 4 | 0.51 | 0.05 |
| 5 | 2.38 | 0.63 |

Single lens data

| Lens | Starting surface | Focal length |
|---|---|---|
| 1 | 1 | -51.220 |
| 2 | 3 | -44.060 |
| 3 | 5 | 63.320 |
| 4 | 7 | 27.240 |
| 5 | 10 | 103.370 |
| 6 | 12 | 23.720 |
| 7 | 13 | -25.360 |
| 8 | 15 | -29.440 |
| 9 | 17 | 95.260 |

Numerical Example 7 unit mm

| Surface number | R | D | Nd | vd | Light effective diameter |
|---|---|---|---|---|---|
| 1 | 36.988 | 2.00 | 1.83481 | 42.7 | 36.37 |
| 2 | 17.193 | 9.24 | | | 28.85 |
| 3 | -131.121 | 1.10 | 1.83400 | 37.2 | 28.47 |
| 4 | 32.736 | 2.45 | | | 27.39 |
| 5 | 30.207 | 3.81 | 1.84666 | 23.8 | 28.54 |
| 6 | 157.442 | (variable) | | | 28.28 |
| 7 | 24.325 | 4.00 | 1.72916 | 54.7 | 13.97 |
| 8 | -116.396 | (variable) | | | 13.23 |
| 9(diaphragm) | ∞ | 1.00 | | | 12.04 |
| 10 | 27.299 | 1.30 | 1.65160 | 58.5 | 11.63 |
| 11 | 48.916 | 0.12 | | | 11.34 |
| 12 | 17.981 | 2.42 | 1.60311 | 60.6 | 11.12 |
| 13 | -30.799 | 0.80 | 1.84666 | 23.8 | 10.63 |
| 14 | 48.512 | (variable) | | | 10.12 |
| 15 | 43.669 | 0.70 | 1.83400 | 37.2 | 9.41 |
| 16 | 9.035 | 1.54 | 1.84666 | 23.8 | 9.22 |
| 17 | 13.879 | (variable) | | | 9.13 |
| 18* | 382.548 | 3.37 | 1.48749 | 70.2 | 16.91 |
| 19 | -61.409 | (variable) | | | 18.62 |
| Image surface | ∞ | | | | |

Aspheric data

| | Conical constant K | 4th coefficient B | 6th coefficient C |
|---|---|---|---|
| 18th Surface | 0.0000E+00 | -5.6762E-05 | -5.1722E-07 |

| | 8th coefficient D | 10th coefficient E | 12th coefficient F |
|---|---|---|---|
| 18th Surface | 6.2887E-09 | -1.0299E-10 | 4.7961E-13 |

Various data

| | Wide angle end | Intermediate | Telephoto end |
|---|---|---|---|
| Focal length | 15.50 | 27.98 | 52.92 |
| Fno | 3.60 | 4.28 | 6.29 |
| ω | 41.39 | 26.02 | 14.47 |
| Image height | 13.66 | 13.66 | 13.66 |
| Lens overall length | 110.00 | 85.27 | 91.69 |
| BF | 11.66 | 27.52 | 49.80 |
| Entrance pupil position | 23.12 | 18.08 | 14.37 |
| Exit pupil position | -31.65 | -16.34 | -12.03 |
| Front side principle point position | 33.07 | 28.20 | 22.00 |
| Rear side principle point position | -3.84 | -0.46 | -3.11 |

Variable interval

| Surface number | Wide angle end | Intermediate | Telephoto end |
|---|---|---|---|
| 6 | 45.37 | 14.17 | 0.66 |
| 8 | 0.50 | 0.99 | 2.09 |
| 14 | 0.50 | 1.79 | 1.65 |
| 17 | 18.14 | 6.96 | 3.65 |
| 19 | 11.66 | 27.52 | 49.80 |

Unit data

| Unit | Starting surface | Focal length | Lens structure length |
|---|---|---|---|
| 1 | 1 | -30.62 | 18.60 |
| 2 | 7 | 27.93 | 4.00 |
| 3 | 9 | 48.17 | 5.63 |

-continued unit mm

| | | | |
|---|---|---|---|
| 4 | 15 | −25.62 | 2.24 |
| 5 | 18 | 108.82 | 3.37 |

| Unit | Front side principle point position | Rear side principle point position |
|---|---|---|
| 1 | 2.66 | −13.20 |
| 2 | 0.40 | −1.94 |
| 3 | −1.31 | −4.90 |
| 4 | 1.89 | 0.62 |
| 5 | 1.96 | −0.31 |

Single lens data

| Lens | Starting surface | Focal length |
|---|---|---|
| 1 | 1 | −40.340 |
| 2 | 3 | −31.310 |
| 3 | 5 | 43.550 |
| 4 | 7 | 27.930 |
| 5 | 10 | 92.610 |
| 6 | 12 | 19.180 |
| 7 | 13 | −22.150 |
| 8 | 15 | −13.790 |
| 9 | 16 | 26.690 |
| 10 | 18 | 108.820 |

TABLE 1

| | Numerical Example | | | | | | |
|---|---|---|---|---|---|---|---|
| Parameter | 1 | 2 | 3 | 4 | 5 | 6 | 7 |
| $f_1$ | −16.33 | −16.22 | −16.02 | −16.23 | −18.91 | −37.32 | −30.62 |
| $f_2$ | 18.63 | 20.05 | 19.48 | 19.93 | 18.02 | 27.24 | 27.93 |
| $f_{Ls}$ | 71.75 | 73.34 | 73.41 | 72.47 | 61.62 | 27.24 | 27.93 |
| $T_{Exp}$ | 36.42 | 36.92 | 36.54 | 34.69 | 38.03 | 41.65 | 43.31 |
| $T_{Lsmin}$ | 7.71 | 8.50 | 7.78 | 8.42 | 8.29 | 11.21 | 6.75 |
| vd | 37.20 | 49.60 | 55.50 | 70.20 | 46.60 | 55.50 | 54.70 |
| $f_w$ | 11.00 | 12.03 | 11.00 | 11.00 | 11.00 | 18.20 | 15.50 |
| $BF_w$ | 11.06 | 10.99 | 11.04 | 11.27 | 16.00 | 19.77 | 11.66 |
| $Y_{max}$ | 13.66 | 13.66 | 13.66 | 13.66 | 13.66 | 13.66 | 13.66 |

TABLE 2

| | | Numerical Example | | | | | | |
|---|---|---|---|---|---|---|---|---|
| Condition | | 1 | 2 | 3 | 4 | 5 | 6 | 7 |
| (1) | $f_{Ls}/f_w$ | 6.52 | 6.10 | 6.67 | 6.59 | 5.60 | 1.50 | 1.80 |
| (2) | $T_{Exp}/f_w$ | 3.31 | 3.07 | 3.32 | 3.15 | 3.46 | 2.29 | 2.79 |
| (3) | $T_{Lsmin}/f_w$ | 0.70 | 0.71 | 0.71 | 0.77 | 0.75 | 0.62 | 0.44 |
| (4) | vdLs | 37.20 | 49.60 | 55.50 | 70.20 | 46.60 | 55.50 | 54.70 |
| (5) | $BF_w/f_w$ | 1.01 | 0.91 | 1.00 | 1.02 | 1.45 | 1.09 | 0.75 |
| (6) | $BF_w/Y_{max}$ | 0.81 | 0.80 | 0.81 | 0.83 | 1.17 | 1.45 | 0.85 |

This application claims the benefit of Japanese Patent Application No. 2012-225027, filed Oct. 10, 2012, which is hereby incorporated by reference herein in its entirety.

What is claimed is:

1. A zoom lens comprising:
in order from an object side to an image side,
a first lens unit having a negative refractive power;
a second lens unit having a positive refractive power; and
a rear unit including a plurality of lens units,
wherein a distance between adjacent lens units changes during zooming,
wherein an image stabilizing unit Ls comprising at least part of the second lens unit moves in a direction perpendicular to an optical axis during blurring correction,
wherein the image stabilizing unit Ls is disposed on a most object side of the second lens unit,
wherein an aperture stop is arranged on a position adjacent to an image side of the image stabilizing unit Ls,
wherein the zoom lens comprises a lens unit for focusing disposed on an image side of the aperture stop,
wherein the lens unit for focusing moves to the image side when focusing from infinity to a closest distance, and
wherein the following conditions are satisfied:

$$1.30 < f_{Ls}/f_w < 10.00$$

$$2.00 < T_{Exp}/f_w < 5.00$$

where $f_{Ls}$ represents a focal length of the image stabilizing unit Ls, $T_{Exp}$ represents a distance between an exit pupil and an image surface of the zoom lens at a wide angle end, and $f_w$ represents a focal length of the zoom lens at the wide angle end.

2. The zoom lens according to claim 1, wherein the following condition is satisfied:

$$0.30 < T_{Lsmin}/f_w < 1.00$$

where $T_{Lsmin}$ represents a minimum value of a distance between the first lens unit and the aperture stop at an arbitrary zoom position from the wide angle end to a telephoto end.

3. The zoom lens according to claim 1, wherein the image stabilizing unit Ls consists of a positive lens.

4. The zoom lens according to claim 1, wherein the following condition is satisfied:

$$BF_w/f_w < 1.6$$

where $BF_w$ represents a back focus at the wide angle end.

5. The zoom lens according to claim 1, wherein the rear unit, in order from the object side to the image side, comprises a third lens unit having a negative refractive power and a fourth lens unit having a positive refractive power.

6. The zoom lens according to claim 5, wherein the third lens unit moves in the optical axis direction during focusing.

7. The zoom lens according to claim 1, wherein the rear unit, in order from the object side to the image side, comprises a third lens unit having a positive refractive power, a fourth lens unit having a negative refractive power and a fifth lens unit having a positive refractive power.

8. The zoom lens according to claim 7, wherein the third lens unit moves in the optical axis direction during focusing.

9. The zoom lens according to claim 1, wherein the zoom lens forms an image on a photoelectric conversion element.

10. An image pickup apparatus comprising:
a zoom lens; and
a photoelectric conversion element configured to receive an image formed by the zoom lens,
wherein the zoom lens comprises:
in order from an object side to an image side,
a first lens unit having a negative refractive power;
a second lens unit having a positive refractive power; and
a rear unit including a plurality of lens units,
wherein a distance between adjacent lens units changes during zooming,
wherein an image stabilizing unit Ls comprising at least part of the second lens unit moves in a direction perpendicular to an optical axis during blurring correction,
wherein the image stabilizing unit Ls is disposed on a most object side of the second lens unit,
wherein an aperture stop is arranged on a position adjacent to an image side of the image stabilizing unit Ls,
wherein the zoom lens comprises a lens unit for focusing disposed on an image side of the aperture stop,
wherein the lens unit for focusing moves to the image side when focusing from infinity to a closest distance, and
wherein the following conditions are satisfied:

$$1.30 < f_{Ls}/f_W < 10.00$$

$$2.00 < T_{Exp}/f_W < 5.00$$

where $f_{Ls}$ represents a focal length of the image stabilizing unit Ls, $T_{Exp}$ represents a distance between an exit pupil and an image surface of the zoom lens at a wide angle end, and $f_w$ represents a focal length of the zoom lens at the wide angle end.

11. The image pickup apparatus according to claim 10, wherein the following condition is satisfied:

$$BF_W/Y_{max} < 1.8$$

where $BF_W$ represents a back focus at the wide angle end, and $Y_{max}$ represents a maximum image height.

* * * * *